US010262654B2

United States Patent
Hakkani-Tur et al.

(10) Patent No.: US 10,262,654 B2
(45) Date of Patent: Apr. 16, 2019

(54) DETECTING ACTIONABLE ITEMS IN A CONVERSATION AMONG PARTICIPANTS

(71) Applicant: Microsoft Technology Licensing, LLC, Redmond, WA (US)

(72) Inventors: Dilek Zeynep Hakkani-Tur, Kirkland, WA (US); Xiaodong He, Sammamish, WA (US); Yun-Nung Chen, Pittsburgh, PA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 859 days.

(21) Appl. No.: 14/864,674

(22) Filed: Sep. 24, 2015

(65) Prior Publication Data

US 2017/0092264 A1 Mar. 30, 2017

(51) Int. Cl.
*G06F 17/27* (2006.01)
*G06N 99/00* (2010.01)
(Continued)

(52) U.S. Cl.
CPC ............ *G10L 15/16* (2013.01); *G06F 17/279* (2013.01); *G06F 17/2785* (2013.01);
(Continued)

(58) Field of Classification Search
CPC ...... G10L 15/22; G10L 15/26; G10L 15/1815
See application file for complete search history.

(56) References Cited

U.S. PATENT DOCUMENTS 7,149,695 B1 12/2006 Bellegarda
8,229,734 B2 7/2012 Bennett
(Continued)

FOREIGN PATENT DOCUMENTS

WO 2013067239 A1 5/2013

OTHER PUBLICATIONS

Pan et al., "A Survey of Transfer Learning", 2009, IEEE Transaction on Knowledge and Data engineering, pp. 1-15 (Year: 2009).*
(Continued)

*Primary Examiner* — Paulinho E Smith
(74) *Attorney, Agent, or Firm* — Rainier Patents, P.S.

(57) ABSTRACT

A computer-implemented technique is described herein for detecting actionable items in speech. In one manner of operation, the technique can include receiving utterance information that expresses at least one utterance made by one participant of a conversation to at least one other participant of the conversation. The technique can also include converting the utterance information into recognized speech information and using a machine-trained model to recognize at least one actionable item associated with the recognized speech information. The technique can also include performing at least one computer-implemented action associated the actionable item(s). The machine-trained model may correspond to a deep-structured convolutional neural network. The technique can produce the machine-trained model using a source environment corpus that is not optimally suited for a target environment in which the model is intended to be applied. The technique can provide adaptation techniques for adapting a source-environment model to better suit the target environment.

20 Claims, 14 Drawing Sheets

(51) Int. Cl.
G06Q 10/10 (2012.01)
G10L 15/16 (2006.01)
G10L 15/20 (2006.01)
G10L 15/22 (2006.01)
G10L 15/26 (2006.01)
(52) U.S. Cl.
CPC ........... *G06N 99/005* (2013.01); *G06Q 10/10* (2013.01); *G10L 15/20* (2013.01); *G10L 15/22* (2013.01); *G10L 15/26* (2013.01)

(56) References Cited

U.S. PATENT DOCUMENTS

| 8,768,705 | B2 | 7/2014 | Sundararaman et al. |
| 8,954,330 | B2 | 2/2015 | Koenig et al. |
| 8,972,253 | B2 | 3/2015 | Deng et al. |
| 2013/0110925 | A1 | 5/2013 | Wessling et al. |
| 2013/0124189 | A1* | 5/2013 | Baldwin ............. G10L 15/1815 704/9 |
| 2013/0212052 | A1 | 8/2013 | Yu et al. |
| 2014/0164299 | A1 | 6/2014 | Sainath et al. |
| 2014/0288928 | A1 | 9/2014 | Penn et al. |
| 2015/0066496 | A1 | 3/2015 | Deoras et al. |
| 2015/0074027 | A1 | 3/2015 | Huang et al. |

OTHER PUBLICATIONS

"International Preliminary Report on Patentability Issued in PCT Application No. PCT/US2016/052362", dated Sep. 1, 2017, 8 Pages.
Tur, et al., "Towards Deeper Understanding: Deep Convex Networks for Semantic Utterance Classification," in Proceedings of IEEE International Conference on Acoustics, Speech, and Signal Processing, Mar. 2012, 4 pages.
Tur, et al., "The CALO Meeting Assistant System," in Journal of IEEE Transactions on Audio, Speech, and Language Processing, vol. 8, Issue 16, Aug. 2010, 11 pages.
Purver, et al., "Detecting Action Items in Multi-Party Meetings: Annotation and Initial Experiments," in Proceedings of the Third International Workshop on Machine Learning for Multimodal Interaction, May 2006, 12 pages.
Kim, et al., "New Transfer Learning Techniques for Disparate Label Sets," in Proceedings of the Association for Computational Linguistics, Jul. 2015, 10 pages.
Yu, et al., "Language Recognition using Deep-Structured Conditional Random Fields," in Proceedings of IEEE International Conference on Acoustics, Speech, and Signal Processing, Mar. 2010, 4 pages.
Banerjee, et al., "Detecting the Noteworthiness of Utterances in Human," in Proceedings of 10th Annual Meeting of the Special Interest Group in Discourse and Dialogue, Sep. 2009, 9 pages.
Brown, et al., "Searchable Objects: Search in Everyday Conversation," in Proceedings of the 18th ACM Conference on Computer Supported Cooperative Work & Social Computing, Mar. 2015, 10 pages.
McMillan, et al., "Repurposing Conversation: Experiments with the Continuous Speech Stream," in Proceedings of the 33rd Annual ACM Conference on Human Factors in Computing Systems, Apr. 2015, 10 pages.
Janin, et al., "The ICSI Meeting Corpus," in Proceedings of IEEE International Conference on Acoustics, Speech, and Signal Processing, vol. 1, Apr. 2003, 4 pages.
Tur, et al., "The CALO Meeting Speech Recognition and Understanding System," in Proceedings of IEEE Spoken Language Technology Workshop, Dec. 2008, 4 pages.
Bangalore, et al., "Learning the Structure of Task-Driven Human—Human Dialogs," in IEEE Transactions on Audio, Speech, and Language Processing, vol. 16, Issue 7, Sep. 2008, 11 pages.
Chen, et al., "Unsupervised Induction and Filling of Semantic Slots for Spoken Dialogue Systems Using Frame-Semantic Parsing," in Proceedings of IEEE Workshop on Automatic Speech Recognition and Understanding, Dec. 2013, 6 pages.
Chen, et al., "Matrix Factorization with Knowledge Graph Propagation for Unsupervised Spoken Language Understanding," in Proceedings of the 53rd Annual Meeting of the Association for Computational Linguistics and the 7th International Joint Conference on Natural Language Processing of the Asian Federation of Natural Language Processing, Jul. 26, 2015, 12 pages.
Chen, et a., "Jointly Modeling Inter-Slot Relations by Random Walk on Knowledge Graphs for Unsupervised Spoken Language Understanding." in Proceedings of Conference of the North American Chapter of the Association for Computational Linguistics—Human Language Technologies, May 31, 2015, 11 pages.
Bui, et al., "Decision detection using hierarchical graphical models," in Proceedings of the ACL Conference Short Papers, Jul. 2010, 6 pages.
Fernandez, et al., "Modelling and Detecting Decisions in Multi-Party Dialogue," in Proceedings of the 9th SIGdial Workshop on Discourse and Dialogue, Jun. 2008, 8 pages.
Yang, et al., "Exploiting Dialogue Act Tagging and Prosodic Information for Action Item Identification," in Proceedings of IEEE International Conference on Acoustics, Speech and Signal Processing, Mar. 2008, 4 pages.
Galley, et al., "Identifying Agreement and Disagreement in Conversational Speech: Use of Bayesian Networks to Model Pragmatic Dependencies," in Proceedings of the 42nd Annual Meeting on Association for Computational Linguistics, Jul. 2004, 8 pages.
Hillard, et al., "Detection of Agreement vs. Disagreement in Meetings: Training with Unlabeled Data," in Proceedings of the 2003 Conference of the North American Chapter of the Association for Computational Linguistics on Human Language Technology: Companion Volume of the Proceedings of HLT-NAACL 2003, Short Papers, vol. 2, May 2003, 3 pages.
Riedhammer, et al., "Long story Short—Global unsupervised Models for keyphrase based meeting summarization," in Journal Speech Communication, vol. 52, Issue 10, Oct. 2010, 15 pages.
Xie, et al., "Integrating Prosodic Features in Extractive Meeting Summarization," in Proceedings of IEEE Workshop on Automatic Speech Recognition, Nov. 2009, 5 pages.
Chen, et al., "Multi-Layer Mutually Reinforced Random Walk with Hidden Parameters for Improved Multi-Party Meeting Summarization," in Proceedings of 14th Annual Conference of the International Speech Communication Association, Aug. 2013, 5 pages.
Yih, et al., "Semantic Parsing for Single-Relation Question Answering," in Proceedings of the 52nd Annual Meeting of the Association for Computational Linguistics, vol. 2, Jun. 2014, 6 pages.
Yih, et al., "Semantic Parsing via Staged Query Graph Generation: Question Answering with Knowledge Base," in Proceedings of the Joint Conference of the 53rd Annual Meeting of the ACL and the 7th International Joint Conference on Natural Language Processing of the AFNLP, Jul. 2015, 12 page.
Belinkov, et al., "VectorSLU: A ContinuousWord Vector Approach to Answer Selection in Community Question Answering Systems," in Proceedings of the 9th International Workshop on Semantic Evaluation, Jun. 2015, 6 pages.
Gao, et al., "Modeling Interestingness with Deep Neural Networks," in Proceedings of the Conference on Empirical Methods in Natural Language Processing, Oct. 2014, 12 pages.
Chen, et al., "Leveraging Frame Semantics and Distributional Semantics for Unsupervised Semantic Slot Induction in Spoken Dialogue Systems," in Proceedings of IEEE Spoken Language Technology Workshop, Dec. 2014, 6 pages.
Chen, et al., "Dynamically Supporting Unexplored Domains in Conversational Interactions by Enriching Semantics with Neural Word Embeddings," in Proceedings of IEEE Spoken Language Technology Workshop, Dec. 2014, 7 pages.
Faruqui, et al., "Improving Vector Space Word Representations Using Multilingual Correlation," in Proceedings of 14th Conference of the European Chapter of the Association for Computational Linguistics, Apr. 2014, 10 pages.
Faruqui, et al., "Retrofitting Word Vectors to Semantic Lexicons," in arXiv:1411.4166 [cs.CL], Proceedings of the Conference of the

(56) References Cited

OTHER PUBLICATIONS

North American Chapter of the Association for Computational Linguistics: Human Language Technologies, Mar. 2015, 10 pages.
Shen, et al., "A Latent Semantic Model with Convolutional-Pooling Structure for Information Retrieval," in Proceedings of the 23rd ACM International Conference on Conference on Information and Knowledge Management, Nov. 2014, 10 pages.
Huang, et al., "Learning Deep Structured Semantic Models for Web Search Using Clickthrough Data," in Proceedings of the 22nd ACM International conference on Conference on Information & Knowledge Management, Oct. 2013, 8 pages.
Shen, et al., "Learning Semantic Representations Using Convolutional Neural Networks for Web Search," in Proceedings of the 23rd International Conference on World Wide Web, Apr. 2014, 2 pages.
Yu, et al., "Improving Lexical Embeddings with Semantic Knowledge," in Proceedings of the 52nd Annual Meeting of the Association for Computational Linguistics, Jun. 2014, 6 pages.
Bengio, et al., "Label Propagation and Quadratic Criterion," in Semi-Supervised Learning, MIT Press, 2006, 26 pages.
Ang, et al., "Automatic Dialog Act Segmentation and Classification in Multiparty Meetings," in Proceedings of IEEE International Conference on Acoustics, Speech, and Signal Processing, Mar. 2005, 4 pages.
Cohen, Jacob, "A Coefficient of Agreement for Nominal Scales," in Educational and Psychological Measurement, vol. 20, No. 1, Nov. 1960, 11 pages.
Chang, et al., "LIBSVM: A Library for Support Vector Machines," in Journal of ACM Transactions on Intelligent Systems and Technology, vol. 2, No. 3, Article 27, Apr. 2011, 27 pages.
"ICSIBoost," available at <<https://github.com/benob/icsiboost>>, retireved on Sep. 8, 2015, 5 pages.
Le, et al., "Distributed Representations of Sentences and Documents," in arXiv:1405.4053 [cs.CL], Proceedings of the 31st International Conference on Machine Learning, May 2014, 9 pages.
He, et al., "Convolutional Latent Semantic Models and their Applications," U.S. Appl. No. 14/242,845, filed Apr. 1, 2014, 61 pages.
Chen et al., "Detecting Actionable Items in Meetings by Convolutional Deep Structured Semantic Models," Proceedings of 2015 IEEE Workshop on Automatic Speech Recognition and Understanding (ASRU 2015), Scottsdale, Arizona, Dec. 13-17, 2015, pp. 375-382, 8 pages.
Chen et al., "Learning Semantic Hierarchy with Distributed Representations for Unsupervised Spoken Language Understanding," Proceedings of the 16th Annual Meeting of the International Speech Communication Association (INTERSPEECH 2015), Dresden, Germany, Sep. 6-10, 2015, pp. 1869-1873, 5 pages.
Chen et al., "Leveraging Behavioral Patterns of Mobile Applications for Personalized Spoken Language Understanding," Proceedings of the 17th ACM International Conference on Multimodal Interaction (ICMI 2015), Seattle, WA, Nov. 9-13, 2015, pp. 83-86, 4 pages.
Demand and Article 34 Amendments filed Jun. 7, 2017 to the International Search Report and Written Opinion dated Jan. 2, 2017 from PCT Application No. PCT/US2016/052362, 15 pages.
"International Search Report and Written Opinion Issued in PCT Application No. PCT/US2016/052362", dated Jan. 2, 2017, 15 pages.
Luan, et al., "Efficient Learning for Spoken Language Understanding Tasks with Word Embedding based Pre-training", in Mitsubishi Electric Research Laboratories, Sep. 6, 2015, 5 pages.
Artzi, et al., "Bootstrapping Semantic Parsers from Conversations", in Proceedings of the Conference on Empirical Methods in Natural Language Processing, Jul. 31, 2011, pp. 421-432, 12 pages.

\* cited by examiner

DETECTING ACTIONABLE ITEMS IN A CONVERSATION AMONG PARTICIPANTS

BACKGROUND

A user may rely on a personal digital assistant to facilitate carrying out certain computer-implemented tasks. In operation, the user may directly issue a spoken command to the personal digital assistant, such as by instructing, "Assistant, set up an appointment with John Smith on Tuesday at 10 o'clock AM." The personal digital assistant applies natural language processing to interpret the user's spoken instruction, and then carries out the user's instruction. While digital assistant technology now offers satisfactory availability, accuracy and convenience, interacting with a personal digital assistant represents an artificial human-machine exchange that departs from the typical manner in which users interact with their environments.

SUMMARY

A computer-implemented technique is described herein for detecting actionable items in speech. In one manner of operation, the technique entails: receiving utterance information that expresses at least one utterance made by one participant of a conversation to at least one other participant of the conversation; converting the utterance information into recognized speech information; using a machine-trained model to recognize at least one actionable item associated with the recognized speech information; and performing at least one computer-implemented action associated the actionable item(s).

In some implementations, the machine-trained model corresponds to a deep-structured convolutional neural network.

In some implementations, the technique produces the machine-trained model based on a source corpus of training data that has been collected from a source environment. The source environment differs from a target environment in which the machine-trained model is intended to be applied. For instance, the source environment may pertain to a domain in which human participants interact with a personal digital assistant, while the target environment pertains to a domain in which human participants of a conversation directly interact with each other. In other implementations, the technique produces the machine-trained model based on training data that pertains to the target environment.

In some implementations, the technique provides various adaptation mechanisms for adapting a source-environment model into a model that is more appropriate for application in the target environment.

The technique has one or more benefits. For instance, the technique operates without disrupting a flow of communication among participants to the conversation. Further, the technique can overcome the potential scarcity of training data associated with the target environment by leveraging more plentiful (but less reliable) training data collected from the source environment.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 1 also shows a training system for generating a machine-trained model for use in the model-application system.

Figure 1:
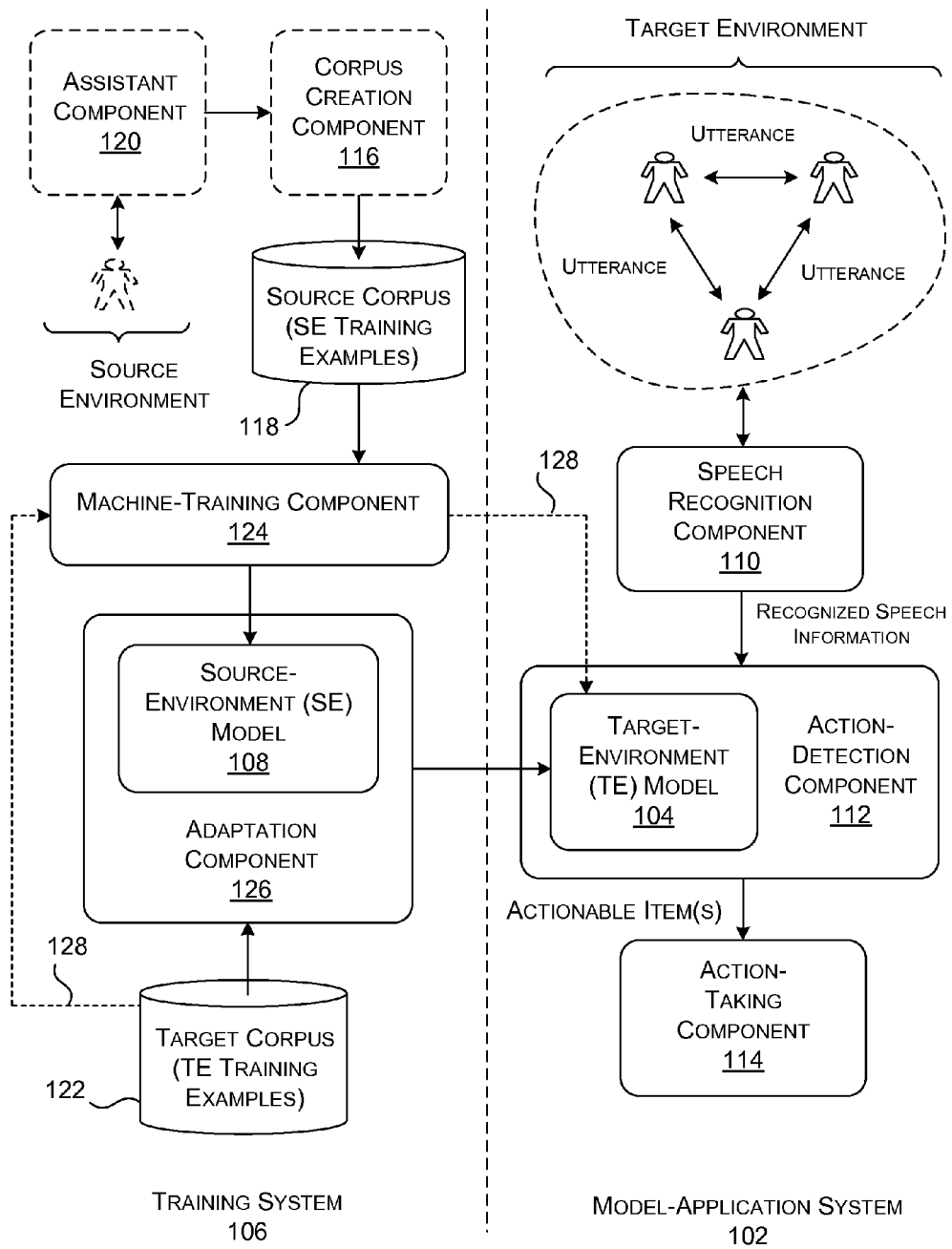
FIG. 1 shows an overview of a model-application system for detecting actionable items in a conversation among two or more participants.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for detecting actionable items in utterances exchanged between two or more people. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, also referred to as functionality, modules, features, elements, etc. The various components shown in the figures can be implemented by various physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented by various physical and tangible mechanisms, for instance, by software running on computer equipment, hardware (e.g., chip-implemented logic functionality), etc., and/or any combination thereof.

As to terminology, the phrase "configured to" encompasses various kinds of physical and tangible functionality that can be constructed to perform an identified operation. The functionality can be configured to perform an operation using, for instance, software running on computer equipment, hardware (e.g., chip-implemented logic functionality), etc., and/or any combination thereof.

The term "logic" encompasses various physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows a model-application system 102 which automatically identifies one or more actionable items in a conversation among two or more people (referred to as participants herein). More specifically, in the conversation, at least one participant directs one or more utterances to one or more other participants. The model-application system 102 detects these utterances, and then determines whether they refer to one or more actionable items. The model-application system 102 may then optionally automatically perform one or more computer-implemented actions based on the identified actionable item(s), e.g., during the conversation or some time thereafter.

For example, assume that two people are conducting a meeting. In the course of a meeting, one participant may say to his or her meeting partner, "I will send them that link." The speaker's utterance can be said to include an actionable item, corresponding to an intent to send an Email message to "them" that include a specified hyperlink ("that link"). The model-application system 102 identifies the above-noted actionable item in the recognized speech information and then optionally automatically performs an action based on the actionable item. The action here entails automatically sending the desired Email message to "them." In certain implementations, the model-application system 102 performs all of these actions in the background, without any participant being required to address a personal digital assistant. By doing so, the model-application system 102 allows the participants to conduct their meeting in a natural manner without the intrusion and interruption of a human-machine exchange.

To perform the above-described tasks, the model-application system 102 applies a machine-trained model 104, such as, but not limited to, a deep-structured (also referred to as a deep-learning) convolutional neural network. A training system 106 generates the machine-trained model 104.

More specifically, in some implementations, the training system 106 produces the machine-trained model 104 such that it is specifically configured to operate within a target environment. Here, the target environment refers to any domain that involves the detection and analysis of a conversation among two or more participants. Hence, the training system 106 can be said to produce a target-environment (TE) model, meaning that the model is designed to operate in the target environment. The machine-trained model 104 will henceforth be referred to as a TE model 104.

Nevertheless, the training system 106 may face a paucity of training data that specifically pertains to the target environment. That is, the training system 106 may not have many training examples which directly pertain to utterances extracted from a conversation among participants, coupled with labeled actionable items associated therewith. For this reason, the training system 106 may rely on a source corpus of training data that has been collected from a source environment. A source environment refers to any domain that is not completely aligned with the defining scenario associated with the target environment. The source corpus contains utterances made by users in the source environment, coupled with labeled actionable items associated therewith.

For example, the source environment may refer to domain in which individuals directly engage an assistant component (e.g., a personal digital assistant), rather than each other. Moreover, that kind of source environment is characterized by a particular mode of human-machine communication based on certain presuppositions. For example, in the source environment, a human typically engages an assistant component in a master-servant mode of interaction. That is, the human (the master) issues a command or makes an inquiry to the assistant component (the servant), with the understanding that the assistant component is a machine that must be engaged in a highly structured and formal manner, and with respect to certain narrowly-drawn domains of interaction. The assistant component then responds to the human's command or inquiry. In contrast, a conversation between two or more humans is more open-ended and informal in nature. In a human conversation, there are occasions when one person (a supervisor) may issue direct instructions to another (e.g., a subordinate). But there are also occasions when people indirectly refer to an actionable item without either participant explicitly ordering the other to perform it. For example, one participant may remark, "If you are so concerned about that issue, maybe you could start by reading the existing Emails about it." The intent here is subtly expressed; the speaker is not ordering or requesting the other person to find the "existing Emails," but is nonetheless making reference to an actionable item that the other person could perform.

In one mode of operation, the training system 106 may initially produce a source-environment (SE) model 108 based on a source corpus of training data obtained from the source data. The SE model 108 has not been designed to operate in the target environment, and therefore can be expected to offer sub-optimal performance when applied to this realm. To address this issue, the training system 106 uses one of more adaptation techniques to convert the SE model 108 into the TE model 104. By virtue of the above-described training technique, the training system 106 can produce an accurate machine-learned model without necessarily having an abundant amount of training data that specifically pertains to the target environment.

With the above introduction, the following section will provide a more detailed overview of the model-application system 102 and the training system 106. Later subsections provide further details regarding individual components shown in FIG. 1.

With respect to the model-application system 102, as stated above, the system 102 is built for operation in a target environment. The target environment pertains to any situation in which two or more people (and/or other entities) carry out a conversation. For instance, in some cases, the conversation may take place as part of a formal business meeting. In other cases, the conversation may refer to a casual chat among friends. More generally stated, some conversations may be primarily goal directed in nature. For example, a discussion between a customer and a sales representative may be directed to the goal of purchasing a product or service. Other conversations may have a meandered and undirected nature. For instance, a discussion between two friends may have no particular "purpose" at the outset, but in the course of the discussion, one participant may nevertheless refer to an actionable item. The model-application system 102 can successfully extract actionable items from any of the above-described conversations.

In some implementations, the model-application system 102 can detect actionable items in a conversation among participants who are present in the same physical locale, such as the same conference room. In other implementations, the model-application system 102 can detect actionable items in a conversation that involves at least one remote participant. That remote participant may interact with one or more other participants via conventional telecommunication technology, such as the SKYPE service provided by Microsoft Corporation of Redmond, Wash. In still other cases, the model-application system 102 can detect actionable utterances in a recorded conversation.

Further note that the term "participant" is to be liberally construed herein. In most of the examples presented herein, the two or more participants of a conversation correspond to two or more humans. But in other cases, at least one participant in the conversation may correspond to a virtual participant. For example, someone may be alone in a conference room and "thinking aloud." That conversation may be said to take place between a "participant" associated with the speaking self and a "participant" associated with the listening self.

In another case, an automated agent (e.g., an assistant component) may be considered as a virtual participant in a conversation when a human participant specifically treats it that way. That is, an automated agent may be considered as a virtual participant when a human user engages it as if it were a substitute for a human participant in a meeting, rather than merely a tool for answering inquiries in a sidebar to the conversation (which is the typical role of an automated agent in today's practice). It is true that the automated agent will not actually have the same communication and cognitive abilities as a human being. But the distinction being made here hinges on the role that a human participant assigns to the automated agent in a conversation (and the consequent manner in which the human participant interacts with the automated agent), not necessarily the ability of the automated agent to fully satisfy all expectations associated with its assigned role. Nevertheless, to facilitate and simplify explanation, it will henceforth be assumed that the two or more participants to the conversation correspond to human beings.

A speech recognition component 110 may use known technology to detect speech. For example, the speech recognition component 110 may receive raw utterance information that expresses at least one utterance made by one participant of a conversation. For instance, the utterance information may correspond to a digital representation of sound waves captured by one or more microphones placed within the target environment. The speech recognition component 110 may then use known techniques (e.g., a deep-structured neural network) to convert the utterance information into recognized speech information. The recognized speech information includes one or more detected utterances by one or more participants to the conversation.

The speech recognition component 110 may also use known techniques to detect the utterances made by different participants, and to subsequently tag each utterance with identifying speaker information. For instance, the speech recognition component 110 can identify speakers by making reference to pre-stored speech profiles associated with the respective speakers. Alternatively, or in addition, the speech recognition component 110 can distinguish the utterances of different speakers based on the different speech characteristics of their utterances. In that case, the speech recognition component 110 can assign dummy labels to the utterances of different individuals, e.g., "speaker A," "speaker B," etc.

An action-detection component 112 applies the TE model 104 to detect zero, one, or more actionable items in any utterance made by a participant. An actionable item refers any computer-implemented task to be performed. Examples of actionable items include, but are not limited to: creating a single reminder, creating a recurrent reminder, creating a calendar entry, finding a calendar entry, performing a search, finding an Email, sending an Email message, deleting a file, finding a file, adding a file to a particular folder, making a telephone call, posting a message to a social network site, and so on. Subsection A.2 (below) provides further illustrative details regarding the operation of the action-detection component 112.

An action-taking component 114 performs an action associated with an actionable item that has been identified. For example, assume that the actionable item corresponds to "send an email." The action-taking component 114 can interact with an Email application to create and send an Email message. In some cases, the action-taking component 114 automatically performs an action as soon as the corresponding actionable item is detected, or some time thereafter (e.g., after the close of a meeting). In other cases, the action-taking component 114 only makes an action after receiving confirmation from a human participant that the action should be taken. For example, after the close of a meeting, the action-taking component 114 can present a list of actions to be taken based on the conversation that has taken place. One or more meeting participants can review the list and select which actions should be performed. Alternatively, the action-taking component 114 can ask for and receive confirmation during the conversation. Subsection A.5 (below) provides further illustrative details regarding the operation of the action-taking component 114.

Now referring to the training system 106, a corpus creation component 116 creates a source corpus of training examples, and stores the source corpus in a data store 118. Each training example may specify: (a) an utterance submitted to an assistant component 120; (b) an actionable item associated with the utterance; and (c) an indication of the relevance of the actionable item to the utterance. The indication of relevance can be expressed in a binary fashion, e.g., <relevant, not relevant>, or it may be expressed as a value within a range of possible values. Such a training example pertains to the source environment because it involves an exchange between a human participant and the assistant component 120, rather than another person.

In contrast, a target corpus of training examples, provided in a data store 122, may provide a set of training examples that specifically pertain to the target domain (in which two or more participants directly speak to each other). Each training example in the target corpus may specify: (a) an utterance that takes place in the conversation among the participants; (b) an actionable item associated with the utterance; and (c) an indication of the relevance of the actionable item to the utterance.

A training example associated with the source environment may differ somewhat from a counterpart training example associated with the target environment. For instance, advancing momentarily to FIG. 2, this figure shows a source environment training example in which a speaker directs the following utterance to the assistant component: "Cortana, schedule a meeting with John for tomorrow." The assistant component maps the speaker's utterance to the actionable item of "create calendar entry." The training example may also provide some indication that the identified actionable item is indeed relevant to the speaker's utterance, which makes this training example a positive example.

Figure 2:
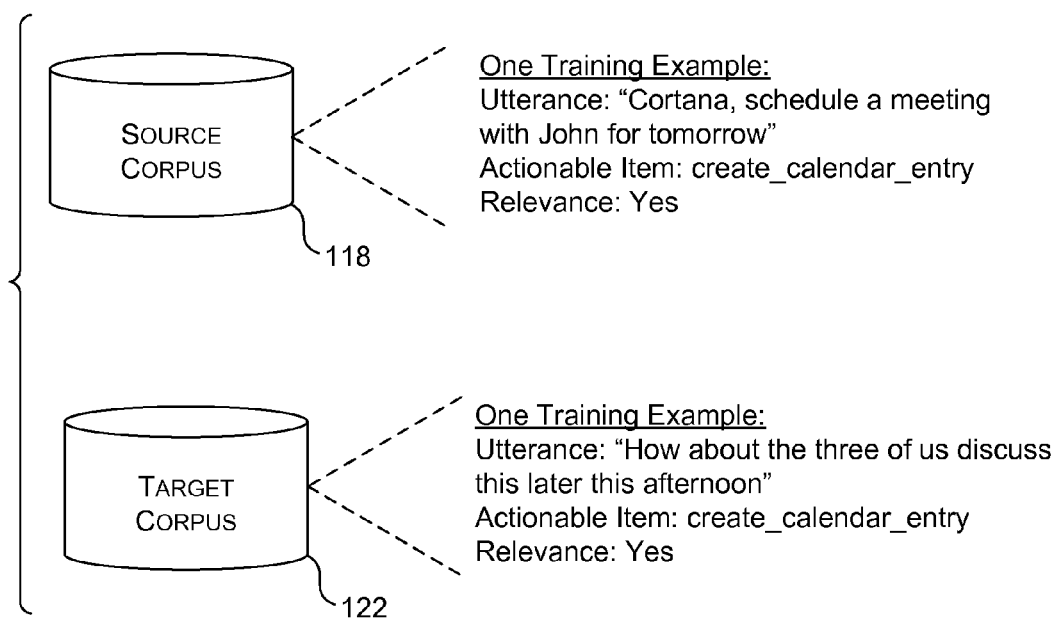
FIG. 2 shows training examples associated with a source-environment corpus and a training-environment corpus.

FIG. 2 also shows a target environment training example in which one participant of a conversation makes the following utterance to another participant of the conversation: "How about the three of us discuss this later this afternoon." The actionable item associated with this utterance corresponds to "create calendar entry." The training example also provides an indication that the identified actionable item is confirmed as being relevant to the detected utterance. Note that both training examples shown in FIG. 2 (from the source environment and the target environment) are mapped to the same actionable item. Further note that both training examples include the same key arguments, such as an argument that identifies the attendees of an appointment, an argument that identifies the time and date of the appointment, and so on. But the triggering language in the two utterances differs to some extent. For this reason, a model that is exclusively trained on the source corpus may not be optimally suited for use in the target environment.

Returning to FIG. 1, a machine-training component 124 uses an iterative machine-training technique to produce the source-environment (SE) model 108. Subsection A.3 (below) provides further details regarding one implementation of the machine-training component 124. The SE model 108 includes a plurality of parameter values (e.g., weighting values) that capture the latent relationships expressed by the source corpus of training examples.

Finally, an adaptation component 126 transforms the SE model 108 into the TE model 104 using one more adaptation techniques. In performing this task, the adaptation component 126 can draw on the target corpus of training examples provided in the data store 122. Subsection A.4 (below) provides further illustrative details regarding the operation of the adaptation component 126.

Finally, while FIG. 1 shows the model-application system 102 as applying the TE model 104, the model-application system 102 can alternatively use the un-adapted source environment model 108 with some success, and aspects of the technology set forth herein encompass this possibility. As another possible variation, the machine-training component 124 can directly produce the TE model 104 based on the training data in the data store 122 (that is, without first generating the SE model 108, and without performing adaptation). The dashed-line path 128 in FIG. 1 represents this alternative technique for generating the TE model 104.

Figure 3:
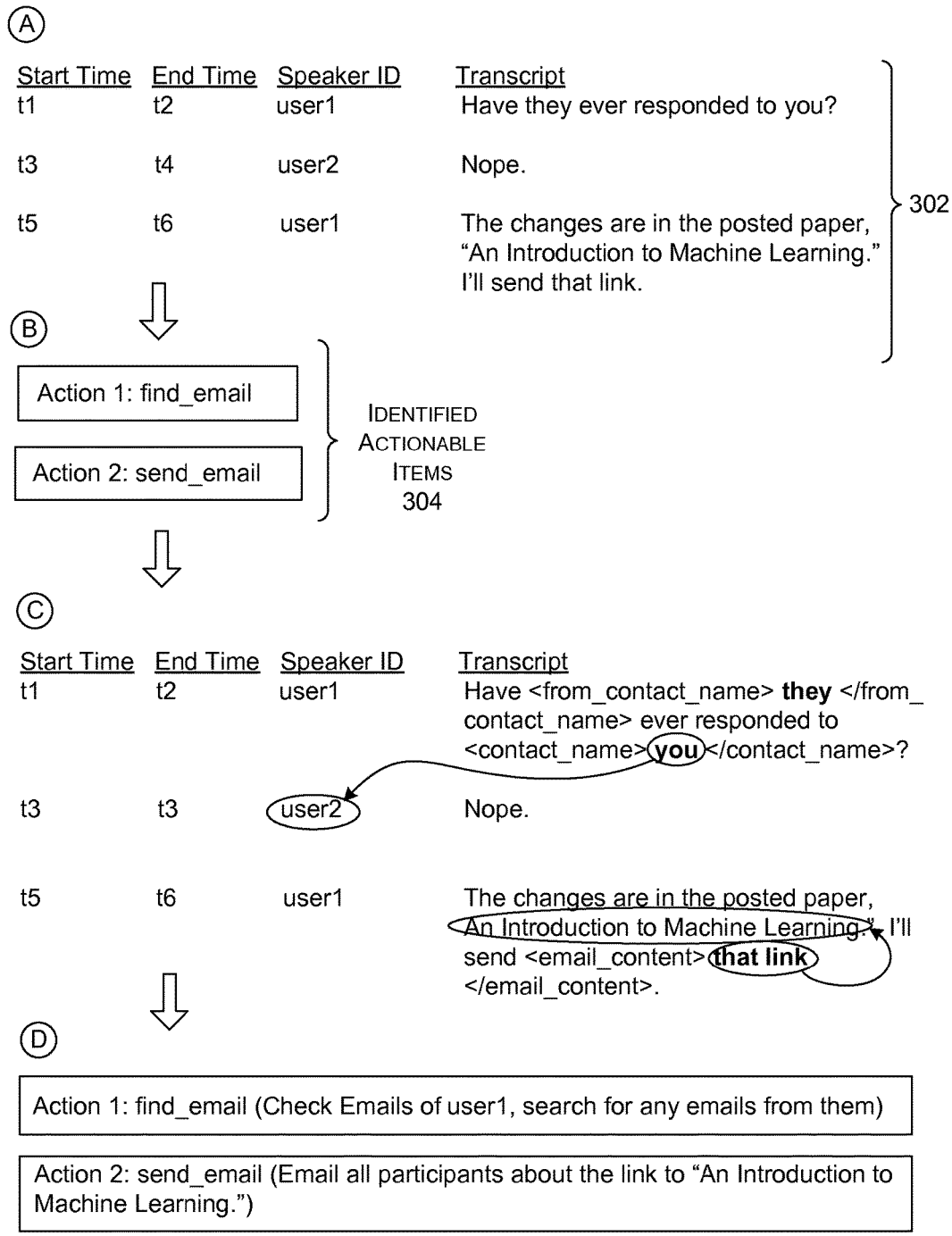
FIG. 3 shows an example of the operation of the model-application system of FIG. 1.

Advancing to FIG. 3, this figure shows an end-to-end example of one manner of operation of the model-application system 102. In state (A), the speech recognition component 110 produces recognized speech information that reflects detected utterances made by two participants of a conversation. More specifically, the speech recognition component 110 produces a transcript 302 of the conversation. For each utterance, the transcript 302 shows a start time of the utterance, an end time of the utterance, an indication of which speaker made the utterance, and the recognized words associated with the utterance.

In state (B), the action-detection component 112 determines that the conversation contains two actionable items 304. That is, the action-detection component 112 determines that the first utterance, reading "Have they ever responded to you?," contains a first actionable item, corresponding to an intent to find one or more Email messages from "them" to "you." The action-detection component 112 determines that the third utterance, reading "I'll send that link," contains a second actionable item, corresponding to an intent to send an Email message that contains a link to a posted paper entitled, "An Introduction to Machine Learning."

In state (C), the action-taking component 114 further processes the recognized speech information in preparation for executing actions associated with the identified actionable items. For example, the action-taking component 114 can parse each utterance to find the action values that are needed in performing the actions. For instance, the action-taking component 114 parses the first utterance to identify the word "they" as an action value, which represents the sender of an Email message. The action-detection component 112 also determines that the word "you" constitutes an action value, referring to the recipient of the Email message. The action-taking component 114 then resolves any ambiguity in the meaning of these action values. For example, with respect to the first utterance, the action-taking component 114 determines that "you" refers to the second speaker in the conversation.

Once the action values are determined and resolved, in state (D), the action-taking component performs the actions associated with the actionable items. For instance, the action-taking component 114 can interact with an Email application to search a data store of previously sent Email messages. The action-taking component 114 can also automatically create and send a new Email message.

A.2. The Action-Detection Component

Figure 4:
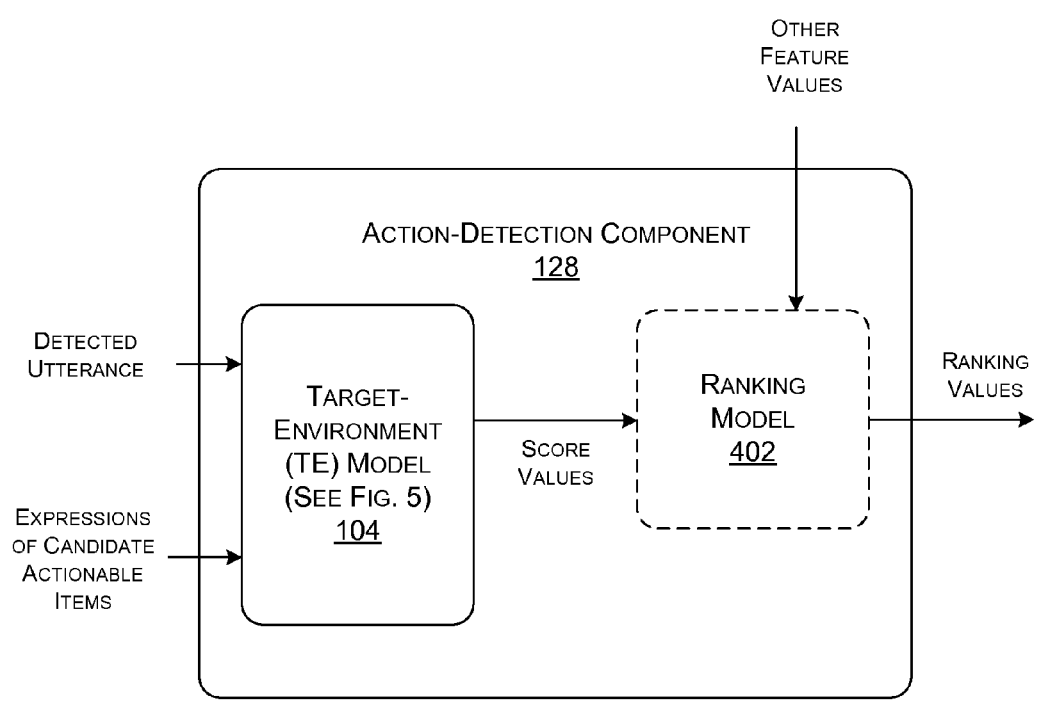
FIG. 4 shows one implementation of an action-detection component, which is a part of the model-application system of FIG. 1.

FIG. 4 shows an overview of one implementation of the action-detection component 112. The action-detection component 112 applies the TE model 104 to determine whether each detected utterance contains an actionable item. To do so, the TE model 104 projects a detected utterance into a high-level semantic space, to produce an utterance embedding. The TE model 104 also projects an expression of each candidate actionable item into the same high-level actionable space, to produce a candidate action embedding for each candidate actionable item.

Alternatively, the training system 106 can perform some of the above-described operations in an offline manner, rather than relying on the action-detection component 112 to perform these actions. For example, as an offline process, the adaptation component 126 can map a complete set of actionable item expressions into the semantic space, to produce a complete set of original candidate action embeddings. Optionally, the adaptation component 126 can also adjust the positions of these candidate action embeddings within the semantic space to produce a set of adjusted candidate action embeddings. The reasons for performing this adjustment operation will be set forth in Subsection A.4.

The TE model 104 generates a plurality of score values for a detected utterance. Each score value reflects a relation (e.g., a semantic similarity) between the utterance embedding (associated with the detected utterance) and the candidate action embedding (associated with a particular candidate actionable item). More specifically, in some implementations (described below), the score value is computed as the cosine similarity between the two embedding vectors in the semantic space. In some implementations, the score values represent the final output result provided by the action-detection component 112. In that case, the action-detection component 128 may identify the candidate actionable item with the most favorable (e.g., highest) score value as the most relevant actionable item associated with the detected utterance.

In other cases, a ranking model 402 treats the score values as input feature values, along with any other feature values. The other feature values may pertain to any other characteristics of a detected utterance and/or a candidate actionable item, and/or a contextual circumstance that is pertinent to the conversation. The ranking model 402 maps the feature values into a plurality of ranking values, one for each candidate actionable item. The ranking model 402 then selects the candidate actionable item having the most favorable ranking value as the most relevant actionable item for the detected utterance under consideration.

In some cases, however, the action-detection component 112, will conclude that no candidate actionable item has a sufficiently favorable score value (or ranking value). In that case, the action-detection component 112 concludes that the utterance does not specify any actionable items.

Figure 5:
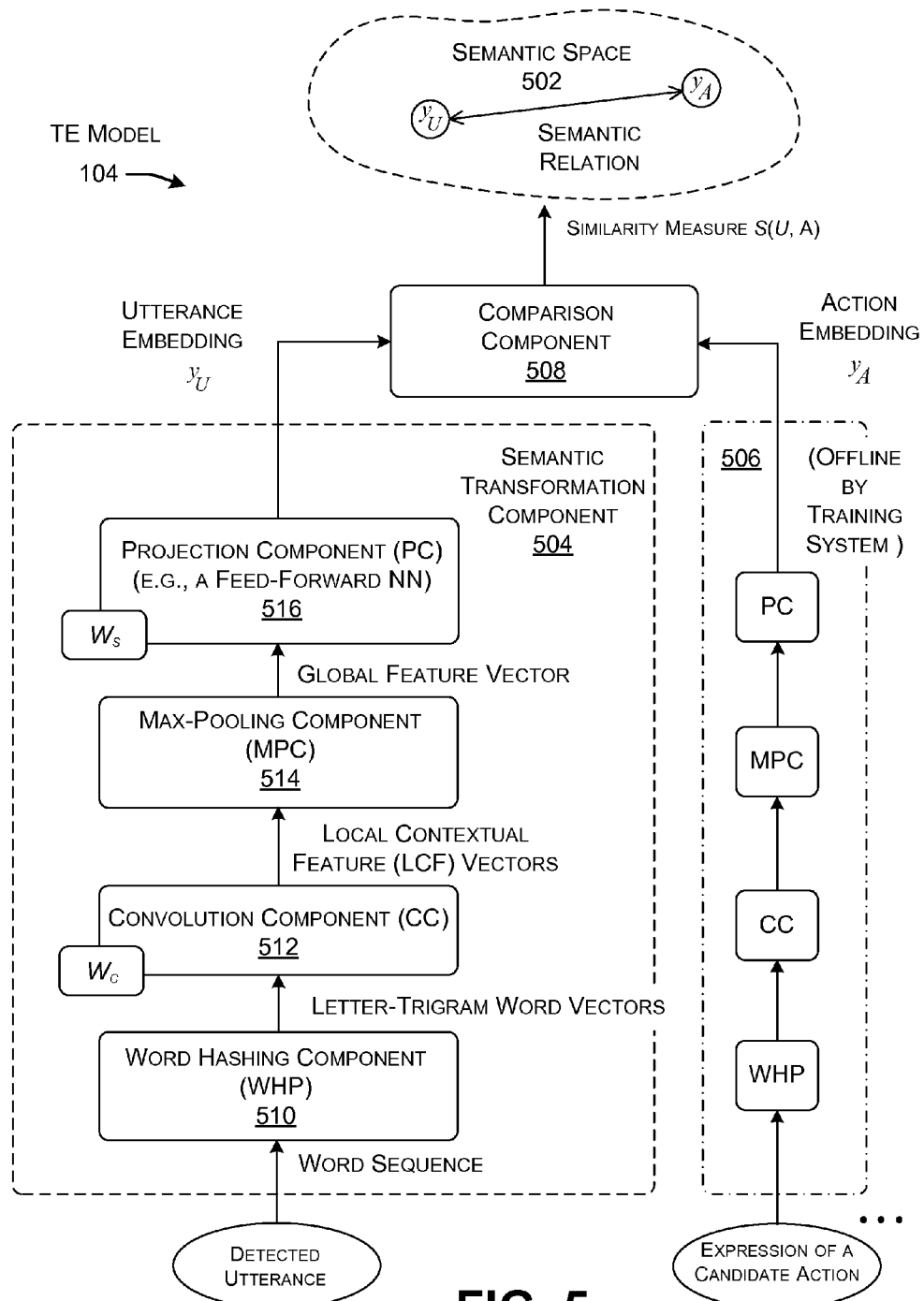
FIG. 5 shows further details of the action-detection component shown in FIGS. 1 and 4.

FIG. 5 shows one implementation of the TE model 104 of FIGS. 1 and 4. Overall, the TE model 104 shown in FIG. 5 corresponds to a deep-structured convolutional neural network. The TE model 104 includes two or more semantic transformation components. Each semantic transformation component maps an input vector, which represents a particular linguistic item, into a particular concept vector. A concept vector (also referred to as an embedding herein) expresses latent semantic information regarding the linguistic item in a semantic space 502.

For example, a first semantic transformation component 504 generates a concept vector $y_U$ (also referred to as an utterance embedding) that describes latent semantic information regarding a detected utterance. A second semantic transformation component 506 generates a concept vector $y_A$ (also referred to as a candidate action embedding) that describes latent semantic information regarding an expression of a candidate actionable item (such as the linguistic item, "find email"). Although not explicitly shown in FIG. 5, the TE model 104 can include many more semantic transformation components. For example, the semantic transformation component 504 can form an utterance embedding $y_U$ for a detected utterance, while other semantic transformation components can form candidate action embeddings ($y_{A1}$, $y_{A2}$, . . . , $y_{An}$) for a plurality of respective candidate actionable items (A1, A2, . . . , An).

In one case, the action-detection component 112 can implement the TE model 104 using plural hardware components which implement plural respective semantic transformation components, such as plural processing components within a parallel processing architecture. Alternatively, or in addition, the action-detection component 112 can provide plural software-implemented semantic transformation components, e.g., corresponding to respective computational threads. Alternatively, or in addition, the action-detection component 112 can use a single actual semantic transformation component to process separate input vectors in series, for example, by projecting a set of actionable item expressions into the semantic space 502, one after the other; in that case, the illustration of separate transformation components in FIG. 5 represents different applications of the same underlying actual semantic transformation component. Finally, as noted above, in an alternative case, the training system 106 can execute some of the above-described operations; for example, the training system 106 can map the expressions of the candidate actionable items into the candidate action embeddings as an offline process. In other words, the training system 106 can implement at least the semantic transformation component 506 shown in FIG. 5.

A comparison component 508 uses any comparison technique to compare the utterance embedding $y_U$ with a candidate action embedding $y_A$, to generate a similarity measure (also referred to herein as a score value or similarity relation). For example, as will be described below, the comparison component 508 can use a cosine similarity technique to generate the similarity measure. Other instantiations of the comparison component 508 (not shown) can be used to compare other pairings of concept vectors.

Figure 6:
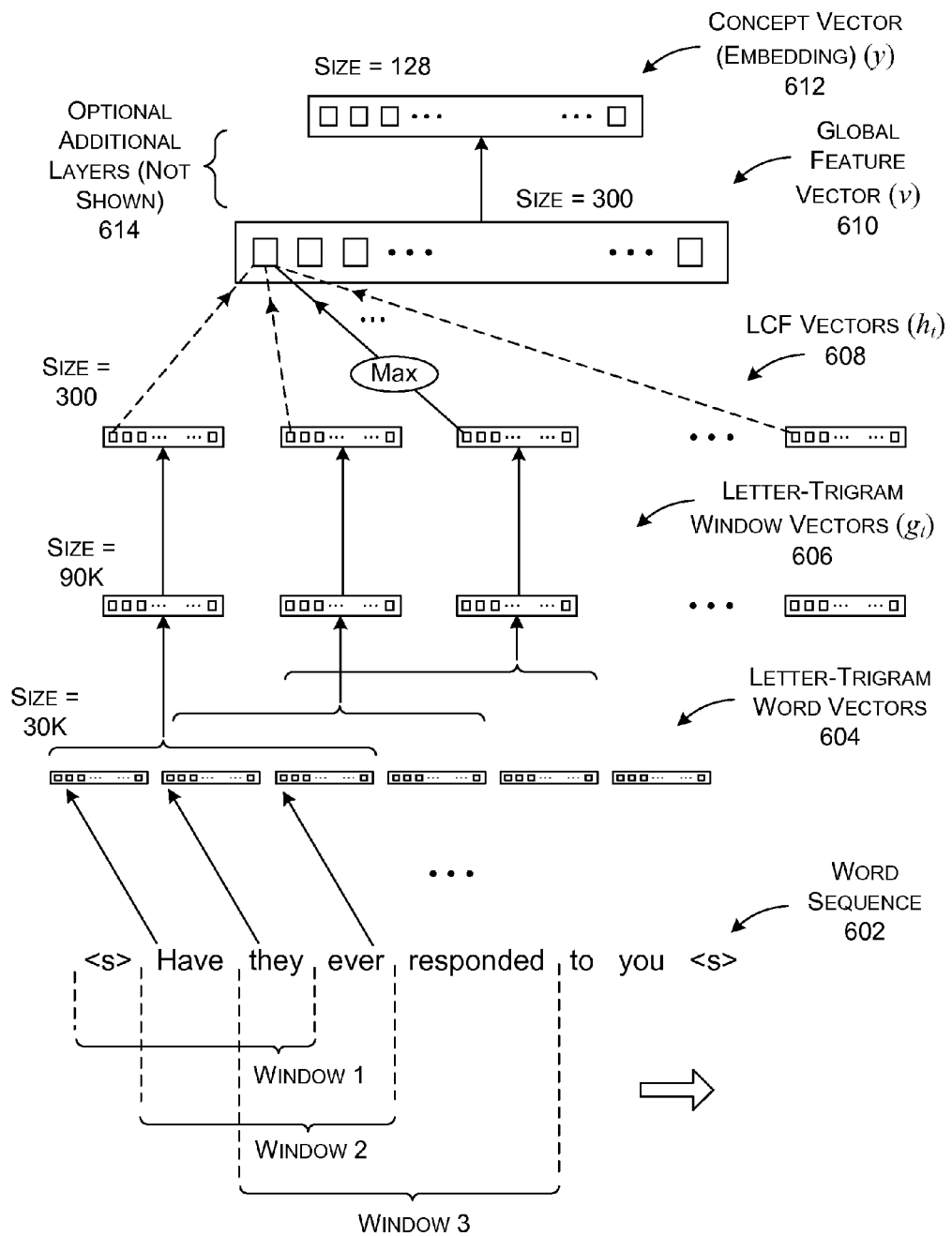
FIG. 6 shows one implementation of a semantic transformation component, which is a part of the action-detection component of FIG. 5.

FIG. 5 shows an illustrative composition of the first semantic transformation component 504. FIG. 6 shows a yet more detailed implementation of the first semantic transformation component 504. The semantic transformation component 504 will be described below by making simultaneous reference to both FIGS. 5 and 6. Other semantic transformation components (such as the second semantic transformation component 506) have a similar composition and process flow compared to the first semantic transformation component 504.

To begin with, assume that the first semantic transformation component 504 processes a detected utterance, corresponding to a word sequence 602 (shown in FIG. 6) which reads, "Have they ever responded to you?" The intent of a conversation participant in making this utterance is to ask a colleague whether that colleague has received an Email message from some party, associated with the pronoun "them."

As a first operation, a word hashing component 510 can add dummy tokens to the beginning and ending of the word sequence 602, such as the symbol "<s>" shown in FIG. 6. The word hashing component 510 can then form a letter-n-gram representation of each word in the word sequence 602. For example, consider the fourth word, "responded," in the word sequence 602. The word hashing component 510 can form a letter-trigram representation of this word by moving a three-letter window across the word to produce a succession of three-letter character groupings, e.g., to produce "res", "esp," "spo", "pon," "ond", "nde," and "ned."

The word hashing component 510 then forms a letter-trigram word vector for each word that expresses the particular letter-trigrams that appear in the word, where the term "letter-trigram word vector" refers to a representation of a word based on a letter-trigram construction. More specifically, each letter-trigram word vector has a number of dimensions corresponding to the total number of three-letter sequences that may appear in a particular natural language, such as English. (But the vector may optionally exclude certain uninteresting letter-trigrams for application-specific reasons.) The word hashing component 510 can form a letter-trigram word vector for a particular word by counting the number of letter-trigrams of each particular type that appear in the word, and then setting values, at corresponding dimensions in the vector, to reflect those counts. For example, the word "responded" would include a "1" entry for each of the trigrams described above ("res", "esp," "spo", etc.), and a "0" entry for all other dimensions, or vice versa. If a particular letter-trigram appears more than once in a particular word, then the count for that dimension would reflect how many times that letter-trigram appears in the word.

As a result of the above operation, the word hashing component 510 forms a set of six letter-trigram word vectors 604 shown in FIG. 6, one for each word in the word sequence 602. In one non-limiting implementation, each letter-trigram word vector has a dimensionality of 30,000, corresponding to the total number of unique letter-trigrams that can appear in a particular word vocabulary. Each letter-trigram word vector is sparsely populated in the sense that it includes only a small number of non-zero entries.

Other implementations of the semantic transformation component 504 can use other types of letter-n-gram representations, not necessarily letter-trigram representations. Further, other implementations can transform each linguistic item into its phonetic representation prior to forming n-grams. Yet other implementations can entirely omit the word hashing component 510. In such an implementation, the semantic transformation component 504 can form input word vectors that allocate a dimension for each complete word that can appear in a vocabulary, rather than each letter-n-gram. That is, in the above example, the alternative word vector for the word "responded" will have a single non-zero entry for the dimension associated with the word "responded."

In a next stage, a convolution component 512 slides an n-word window across the word sequence 602, to identify a series of word groupings, each formed by n consecutive words (here n=3). For example, the convolution component 512 identifies a first word grouping having the words "<s> Have they" (where the <s> token is considered as a word), a second word grouping having the words "Have they ever," a third word grouping having the words "they ever responded," and so on. The convolution component 512 then transforms each word grouping into a local contextual feature (LCF) vector.

More specifically, consider the operations of the convolution component 512 with respect to a particular window, such as the window that identifies the three words "Have," "they," and "ever." The convolution component 512 first concatenates the letter-trigram word vectors associated with the words in the window, to form a letter-trigram window vector (where the term "letter-trigram window vector" refers to a representation of a window using a letter-trigram construction). The letter-trigram window vector has 90,000 dimensions in the particular example of FIG. 6 because it is formed by concatenating three 30,000-dimension vectors. Overall, as shown in FIG. 6, the convolution component 512 produces a total number T of letter-trigram window vectors 606, with letter-trigram window vector $g_t$ referring to one of the T letter-trigram window vectors.

Next, the convolution component 512 transforms each letter-trigram window vector ($g_t$) into a local contextual feature (LCF) vector ($h_t$), using a matrix $W_c$, referred to herein as a convolution matrix. This operation yields a total number T of local contextual feature (LCF) vectors 608, where T depends on a number of words in the word sequence 602. More specifically, the convolution component 512 may compute a particular LCF vector $h_t$ as:

$$h_t = \tan h(W_c \cdot g_t) \quad (1).$$

The tan h function constitutes a particular activation function, and is given by:

$$\tanh(x) = \frac{1 - e^{-2x}}{1 + e^{-2x}}. \quad (2)$$

Each LCF vector may have a greatly reduced dimensionality compared to its corresponding letter-trigram window vector, and its contributing letter-trigram word vectors. For example, the LCF vector may have (in one non-limiting case) a dimensionality of 300, whereas its corresponding letter-trigram window vector has a dimensionality of 90,000.

In a next phase of operation, a max-pooling component 514 forms a single global feature vector v (610) by pulling respective maximum values from the LCF vectors 608. More specifically, consider the first element of the global feature vector v, corresponding to the first dimension of that vector. The max-pooling component 514 identifies the values expressed by the corresponding first elements of the LCF vectors, and then selects the maximum value among those values. The max-pooling component 514 then inserts that maximum value into the first element of the global feature vector v. More formally stated, the values of the global feature vector can be computed by the equation:

$$v(i) = \max_{t=1,...T} \{h_t(i)\}, i = 1, ... K. \quad (3)$$

Here, i refers to a particular element and a particular dimension in the global feature vector v, and, correspondingly, in each of the T LCF vectors, $h_t$. K is the total number of elements (and dimensions) in the global feature vector. More specifically, the global feature vector v has the same dimensionality of each of the individual LCF vectors, e.g., 300 in one particular case. From a high-level standpoint, the max-pooling operation has the effect of selecting the most semantically salient words in the input word sequence 602.

Finally, a projection component 516 projects the global feature vector v into a continuous-valued concept vector y (612) (also referred to as an embedding) using a semantic projection matrix $W_s$. More specifically, the projection component 516 may generate the concept vector y using the following equation:

$$y = \tan h(W_s \cdot v) \quad (4).$$

The tan h function may correspond to the same activation function expressed by Equation (2). In other words, the elements of the global feature vector v constitute neurons in a one layer of a feed-forward neural network. Likewise, the elements of each particular concept vector y constitute neurons in another, subsequent, layer of the neural network. Equations (4) and (2) describe how the values of the neurons in the concept vector y are computed from the values of the neurons in the global feature vector v. In other implementations, the projection component 516 produces the concept vector y by transforming the global feature vector v using one or more additional intermediate neural network layers 614 (not specifically shown in FIG. 6). In that case, the projection component 516 forms a multi-layer neural network. Overall, the concept vector y accurately represents both the local linguistic context of words in the detected utterance, as well as the global meaning of the detected utterance as a whole.

In the context of FIG. 5, the conception vector y described above corresponds to an utterance embedding $y_U$. The second semantic transformation component 506 performs the same operations described above (potentially as an offline process), e.g., by transforming an expression of a candidate actionable item (such as "find email") into a candidate action embedding $y_A$ (and then potentially adjusting the position of the embedding $y_A$ in the manner described below). The comparison component 508 then computes the similarity between the utterance embedding $y_U$ and the candidate action embedding $y_A$ in the semantic space 502, e.g., using the following cosine similarity equation:

$$S(U, A) = \text{cosine}(y_U, y_A) = \frac{y_U \cdot y_A}{\|y_U\|\|y_A\|}. \quad (5)$$

That is, the value S(U, A), referred to herein as a score value or similarity relation, reflects the similarity or closeness between the utterance embedding and the candidate action embedding in the semantic space 502. Other instantiations of the comparison component 508 can compute the relation between other pairs of utterances and candidate actionable items. For example, each instantiation of the comparison component 508 can compute the similarity between an utterance embedding and a candidate action embedding associated with a particular candidate actionable item.

As a closing note to this subsection, the action-detection component 112 can use other types of machine-learned models besides the above-described deep-structured convolutional neural network. For example, the action-detection component 112 can use a neural network that directly transforms an n-gram representation of an input vector into a concept vector y, e.g., without the convolutional operation.

A.3. The Machine-Training Component

Figure 7:
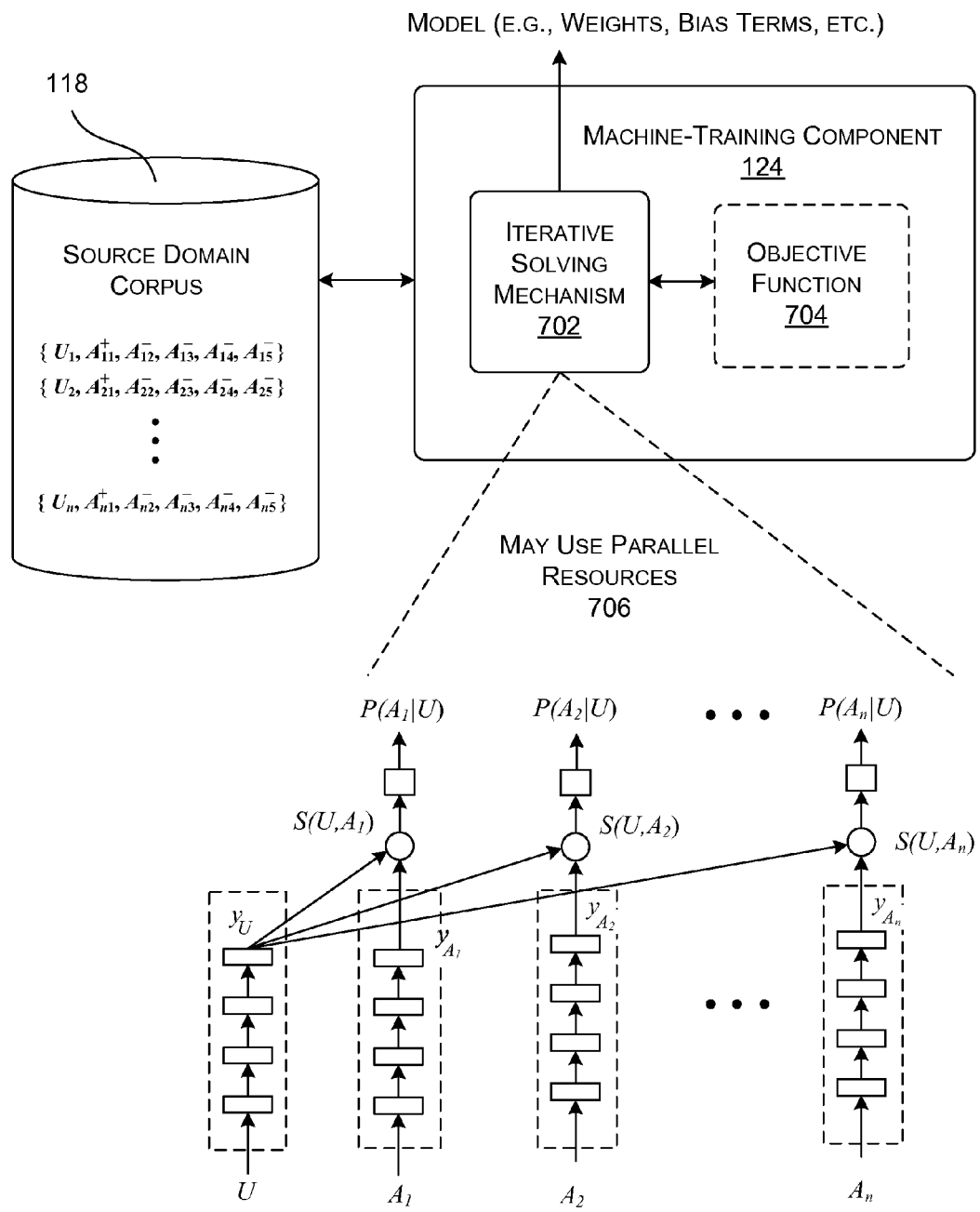
FIG. 7 shows one implementation of a machine-training component, which is another part of the training system of FIG. 1.

FIG. 7 shows one implementation of the machine-training component 124 of FIG. 1. The machine-training component 124 processes a source corpus of training data (provided in a data store 118), to generate the SE model 108. The model 108 represents the matrices described above, namely the convolution matrix $W_c$ and the semantic projection matrix $W_s$. In other words, the SE model 108 corresponds to its parameter values, $\Lambda\{W_c, W_s\}$. While this section will be framed in the context of the generation of the SE model 108, the machine-training component 124 can alternatively perform the same operations (to be described below) to generate the TE model 104 based on a target corpus of training data in the data store 122.

The training data includes a series of examples of the type shown in FIG. 2. That is, each training example may include: (a) an utterance that a user has submitted to the assistant component 120; (b) an actionable item associated with the detected utterance; and (c) an indication of whether the actionable item is pertinent to the detected utterance. In some cases, the assistant component 120 determines the actionable item associated with each detected utterance. The speaker of the utterance may supply feedback that provides the indication of whether the actionable item (chosen by the assistant component 120) is pertinent to the utterance. For instance, if the user says, "No," in response to the assistant component's interpretation, then the proposed actionable item is incorrect. Otherwise, the actionable item may be considered to be correct.

More formally stated, in one non-limiting implementation, each training instance in the source corpus includes a detected utterance (U), an actionable item ($A^+$) that is considered relevant to the utterance, and at least one actionable item ($A^-$) that is not considered relevant to the utterance. More specifically, FIG. 7 shows that a training instance includes four not-appropriate actionable items $\{A_2^-, A_3^-, A_4^-, A_5^-\}$, but a training instance can include any number of such actionable items. In a preliminary operation, the machine-training component 124 operates on the training instances to convert the utterances and actionable items into an appropriate trigram form.

The machine-training component 124 operates by using an iterative solving mechanism 702 to iteratively achieve an objective defined an objective function 704, by iteratively changing the parameter values of the model $\Lambda$. When the iterative processing is finished, the final parameter values constitute the trained model $\Lambda$. The objective function 704, in turn, mathematically expresses an aim which the model $\Lambda$ seeks to achieve, when fully trained. In the present case, the objective function stipulates that the conditional likelihood of the appropriate actionable items, given respective utterances, is to be maximized, and the conditional likelihood of non-appropriate actionable items, given the utterances, is to be reduced.

To mathematically derive the objective function, first note that the probability P (A|U) of a relevant actionable item ($A^+$) in a training instance, given an utterance U, can be expressed as a softmax function as follows:

$$P(A^+ \mid U) = \frac{\exp(\psi S_A(U, A^+))}{\sum_{A' \in A} \exp(\psi S_A(U, A'))}. \quad (6)$$

The term $S_A(U, A^+)$ represents the similarity between the utterance U and an appropriate actionable item $A^+$ in the semantic space, for a given current selection of parameters associated with a model $\Lambda$. The term A represents the set of five actionable items in the training instance, including $A^+$ and the four non-relevant actionable items. The term $S_A(U, A')$ represents the similarity between the utterance U and one of the actionable items (A') in the training instance, in the semantic space. The symbol $\psi$ represents an empirically-derived smoothing factor (e.g., which can be generated by analyzing a held-out dataset of training examples). For this individual training instance, the objective function will express an attempt to make $S(U, A^+)$ as high as possible, and each $S(U, A^-)$ as low as possible, to overall make $P(A^+|U)$ as high as possible, and each $P(U^-|A)$ as low as possible.

Overall, when considering all of the training instances in the source corpus, the objective function involves attempting to maximize the conditional likelihood of the appropriate actionable items given the corresponding utterances, or equivalently, minimize the following loss equation:

$$L(\Lambda) = -\log \prod_{(U,A^+)} P(A^+ \mid U). \quad (7)$$

In other words, the objective is to derive a set of parameter values that minimizes the above equation, with respect to all of the training instances in the source corpus, or some subset thereof.

In one approach, the iterative solving mechanism 702 uses a gradient-based numerical optimization algorithm to solve the above problem, such as a gradient descent technique. The iterative solving mechanism 702, for instance, can apply the following update rule to perform the optimization:

$$\Lambda_t = \Lambda_{t-1} - \epsilon_t \frac{\partial loss(\Lambda)}{\partial \Lambda} \bigg|_{\Lambda=\Lambda_{t-1}}. \quad (8)$$

Here, $\partial$ loss($\Lambda$) correspond to a sample-wise loss function. $\Lambda_t$ and $\Lambda_{t-1}$ are the models at the $t^{th}$ and $t-1^{th}$ iterations, respectively, and $\epsilon_t$ is a learning rate parameter. From a high-level perspective, the iterative solving mechanism 702 makes a large change in the model $\Lambda$ whenever the model $\Lambda$ is changing by a relatively large amount from iteration to iteration, and makes a smaller change in the model $\Lambda$ whenever the model $\Lambda$ is changing by a smaller amount.

The term $$\frac{\partial loss(\Lambda)}{\partial \Lambda}$$

can be derived as follows. First, the loss function derived above can be expressed as follows:

$$loss(\Lambda) = \log(1 + \Sigma_j \exp(-\psi \Delta_j)) \quad (9),$$

where $\Delta_j = S(U, A^+) - S(U, A_j^-)$. The gradient of the loss function with respect to the semantic projection matrix $W_s$ is:

$$\frac{\partial loss(\Lambda)}{\partial W_s} = \sum_j \alpha_j \frac{\partial \Delta_j}{\partial W_s}, \quad (10)$$

where:

$$\frac{\partial \Delta_j}{\partial W_s} = \frac{\partial S(U, A^+)}{\partial W_s} - \frac{\partial S(U, A_j^-)}{\partial W_s}, \quad (11)$$

and $$\alpha_j = \frac{-\psi \exp(-\psi \Delta_j)}{1 + \sum_{j'} \exp(-\psi \Delta_{j'})}. \quad (12)$$

To simplify the following notation, let a, b, and c correspond to $y_U^T y_A$, $1/\|y_U\|$, and $1/\|y_A\|$, respectively. Finally, assume that the activation function used by the model corresponds to the tan h function described above in Equation (2). With those definitions, each term in the right-hand side of Equation (11) can be calculated using the following formula:

$$\frac{\partial S(U, A)}{\partial W_s} = \frac{\partial}{\partial W_s} \frac{y_U^T y_A}{\|y_U\| \|y_A\|} = \delta_{y_U}^{(U,A)} v_U^T + \delta_{y_A}^{(U,A)} v_A^T, \quad (13)$$

where, for a particular pair of (U, A):

$$\delta_{y_U}^{(U,A)} = (1-y_U) \circ (1+y_U) \circ (bc y_A - acb^3 y_U) \quad (14),$$

and $$\delta_{y_A}^{(U,A)} = (1-y_A) \circ (1+y_A) \circ (bc y_U - abc^3 y_A) \quad (15).$$

In the above equations, the operation is an element-wise multiplication (i.e., a Hadamard product).

In order to compute the gradient of the loss function with respect to the convolution matrix $W_s$, $\{\delta\}$ is computed for each $\Delta_j$ at the max-pooling layer. More specifically, each $\delta$ in the max-pooling layer v can be calculated through back propagation as:

$$\delta_{v_U}^{(U,A)} = (1+v_U) \circ (1-v_U) \circ W_s^T \delta_{y_U}^{(U,A)} \quad (16)$$

and $$\delta_{v_A}^{(U,A)} = (1+v_A) \circ (1-v_A) \circ W_s^T \delta_{y_A}^{(U,A)} \quad (17).$$

To propagate the error from the max-pooling layer to the convolutional layer, it is appropriate to trace back to the local features that "win" in the max-pooling operation, as in:

$$t_U(i) = \underset{t=1,\ldots T_U}{\operatorname{argmax}} \{h_t(i)\}, \quad i = 1, \ldots, K, \text{ and} \quad (18)$$

$$t_A(i) = \underset{t=1,\ldots T_A}{\operatorname{argmax}} \{h_t(i)\}, \quad i = 1, \ldots, K. \quad (19)$$

Correspondingly, the gradient of the loss function with respect to the convolution matrix $W_c$ can be computed as:

$$\frac{\partial loss(\Lambda)}{\partial \Lambda} = \sum_j \alpha_j \frac{\partial \Delta_j}{\partial W_c}, \quad (20)$$

where, for the i-th row of the convolution matrix, $$W_{c,i}, i = 1, \ldots, K, \frac{\partial \Delta_j}{\partial W_{c,i}}$$

can be computed as:

$$\frac{\partial \Delta_j}{\partial W_{c,i}} = \left( \delta_{v_U}^{(U,A^+)}(i) g_{U,t_U(i)}^T + \delta_{A^+}^{(U,A^+)}(i) g_{A^+,t_{A^+}(i)}^T \right) - \left( \delta_{v_U}^{(U,A_j^-)}(i) g_{U,t_U(i)}^T + \delta_{A_j^-}^{(U,A_j^-)}(i) g_{A_j^-,t_{A_j^-}(i)}^T \right). \quad (21)$$

Here, $\delta(i)$ is the i-th element of $\delta$, and $g_{U,t}$ and $g_{A,t}$ are the letter-trigram window vectors at the t-th position of U and A, respectively, as described above.

The machine-training component 124 can perform the above-described processing using parallel processing resources 706. The parallel processing resources 706 can be implemented in any manner, e.g., using hardware units, software units, or a combination thereof. For example, the machine-training component 124 can use an architecture similar to that shown in FIG. 5. Each separate action-processing unit (for processing an expression of an actionable item) can include at least a convolution component (CC) for producing LCF vectors, a max-pooling component (MPC) for forming a global feature vector v, a projection component (PC) for generating an action embedding $y_A$ in the semantic space, a comparison component for generating the similarity measure S(U, A), and a softmax component for generating P(A|U). Another processing unit can generate an utterance embedding $y_U$ for the detected utterance U in the semantic space.

Finally, note that the above-described analysis is used to generate a model $\Lambda\{W_c, W_s\}$ that is predicated on the posterior probability of a possible candidate actionable item given a detected utterance, in other words P (A|U). That model will now be referred to as $\Lambda_1$ $\{W_{c1}, W_{s1}\}$. The above-described analysis can also be used to generate a second model $\Lambda_2$ $\{W_{c2}, W_{s2}\}$ that is predicated on the posterior probability of a possible utterance given a candidate actionable item, in other words P(U|A). To compute the second model, the training system 106 uses the same equations set forth above, with the symbols U and A interchanged.

The action-determination component 112 can use either the first model or the second model to generate its predictions. In another implementation, the action-detection component 112 can generate a final score value $S_{comb}(U_i, A_j)$ for a detected utterance $U_i$ and a candidate actionable item $A_j$ that depends on a first score value $S_1(U_i, A_j)$ generated by the first model $\Lambda_1$ and a second score value $S_2(U_i, A_j)$ generated by the second model $\Lambda_2$:

$$S_{comb}(U_i, A_j) = \gamma \cdot S_1(U_i, A_j) + (1-\gamma) \cdot S_2(U_i, A_j) \quad (22).$$

In this equation, $\gamma$ corresponds to a weighting value.

A.4. The Adaptation Component

As noted above, the adaptation component 126 (of FIG. 1) performs the task of adapting the source-environment (SE) model 108 to the target environment, to produce the final target-environment (TE) model 104 used by the action-detection component 112. This subsection describes, without limitation, two techniques that the adaptation component 126 can use to perform this task.

In a first technique, the adaptation component 126 leverages the machine-training component 124 to continue training the SE model 108 using the technique described in the previous subsection, but now with the target corpus provided in the data store 122. The target corpus provides examples of utterances and associated actionable items that specifically pertain to the target environment, not the source environment. As a result, the adaptation component 126 produces a TE model 104 that can provide satisfactory results for both the source environment and the target environment.

In a second technique, the adaptation component 126 produces adjusted action embeddings using the SE model 108, but does not retrain the SE model 108 itself. Rather, the second technique adjusts the action embeddings produced by the SE model 108 (when applied to a target corpus) using an iterative graph-based technique. The second technique will be explained below in conjunction with FIGS. 8 and 9, which show a simplified example of the application of this technique.

Figure 8:
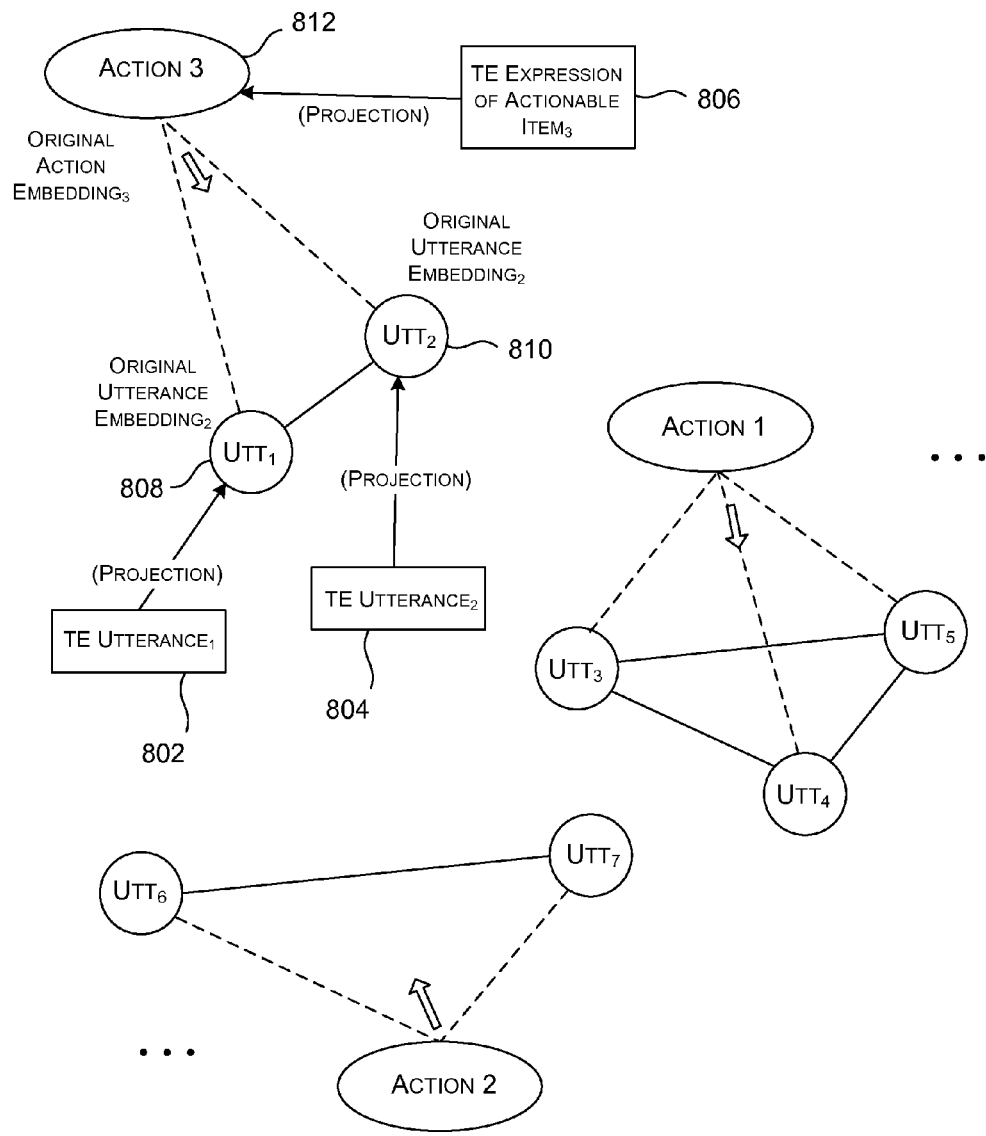
FIGS. 8 and 9 show one example of the operation of an adaptation component, which is part of the training system of FIG. 1

In the illustrative example of FIG. 8, assume that a small part of the target corpus includes seven detected utterances. The detected utterances have been variously associated with three actionable items (i.e., Action 1, Action 2, and Action 3). For example, a human evaluator may apply tags to the seven utterances to associate each utterance to its most relevant actionable item.

The adaptation component 126 begins by using the SE model 108 to transform each detected utterance (from the target corpus) into an original utterance embedding in a semantic space. The adaptation component 126 also uses the SE model 108 to transform each actionable item (from the target corpus) into an original action embedding in the same semantic space. For example, in FIG. 8, assume that the target corpus indicates that at least two detected utterances (utterance$_1$ 802 and utterance$_2$ 804) are associated with actionable item$_3$ 806, i.e., Action 3. The adaptation component 126 uses the SE model 108 to map these two detected utterances (802, 804) into two original utterance embeddings (808, 810), and uses the SE model 108 to map the input actionable item 806 into the original action embedding 812. The adaptation component 126 performs the same operation with respect to all training examples in the training corpus. Hence, the adaptation component 126 performs the same operations described above for Actions 1 and 2, and the detected utterances corresponding to these actionable items.

The adaptation component 126 then adjusts the positions of the original action embeddings in a semantic space to more accurately represent the target environment, to provide a plurality of adjusted action embeddings. The adaptation component 126 performs this adjustment based on the distribution of the original action embeddings and the original utterance embeddings in the semantic space. More specifically, the adaptation component 126 can perform this operation by minimizing an objective function, such as, without limitation, the following objective function:

$$\Phi(\hat{Q}, \hat{R}) = \Phi_{act}(\hat{Q}, \hat{R}) + \Phi_{utt}(\hat{R}), \text{ where} \quad (23)$$

$$\Phi_{act}(\hat{Q}, \hat{R}) = \sum_{p=1}^{n}\left[\alpha_p\|\hat{q_p} - q_p\|^2 + \sum_{l(r_k)=p}\beta_{pk}\|\hat{q_p} - \hat{r_k}\|^2\right], \quad (24)$$

and $$\Phi_{utt}(\hat{R}) = \sum_{p:l(r_p)=1}^{n}\left[\alpha_p\|\hat{r_p} - r_p\|^2 + \sum_{l(r_k)=l(r_p)}\beta_{pk}\|\hat{r_p} - \hat{r_k}\|^2\right]. \quad (25)$$

In this function, Q represents a set of original action embeddings, while R represents a set of original utterance embeddings. The notation $q_p \in Q$ represents a particular original action embedding for an actionable item p. The notation $r_k \in R$ represents a particular original utterance embedding for a $k^{th}$ utterance. The notation $l(r_k)$ represents an action label associated with an original utterance embedding $r_k$. $\hat{Q}$ (with individual members $\hat{q_p}$) represents a set of adjusted action embeddings, while $\hat{R}$ (with individual members $\hat{r_k}$) represents a set of adjusted utterance embeddings. α and β represent empirically-selected weighting values.

Figure 9:
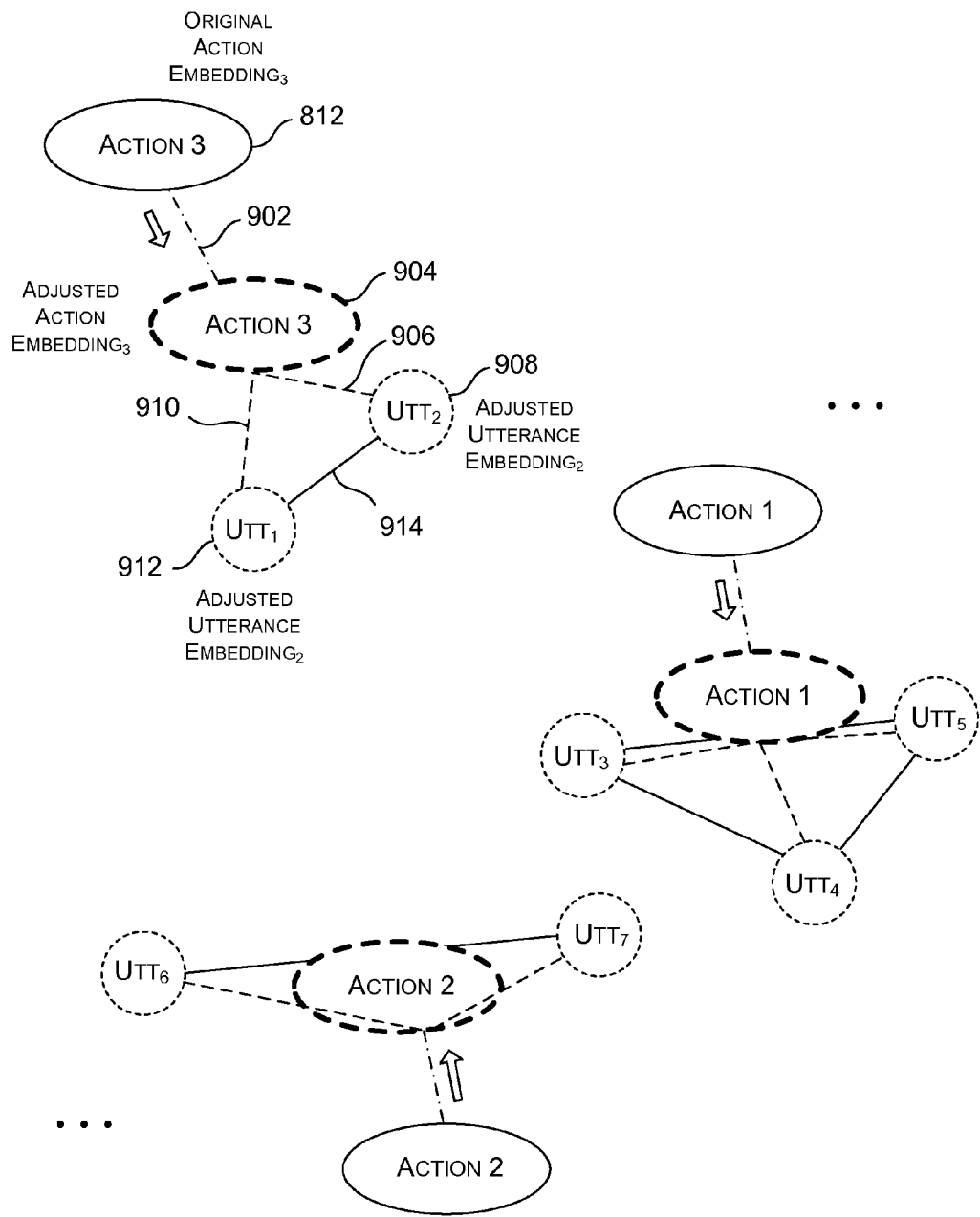

The first distance term in Equation (24) reflects a Euclidean distance (more generally, a distance relation) in semantic space between an original action embedding ($q_p$) and its corresponding adjusted action embedding ($\hat{q_p}$) for the actionable item p. In the example of FIG. 9, this distance corresponds to the line 902 between an original action embedding 812 associated with Action 3 and a counterpart adjusted action embedding 904 for Action 3.

The second Euclidean distance term in Equation (24) reflects a distance in semantic space between an adjusted action embedding ($\hat{q_p}$) (for actionable item p) and each adjusted utterance embedding ($\hat{r_k}$) that is associated with the actionable item p. In the example of FIG. 9, the second distance term in Equation (24) corresponds to two distances, corresponding to the line 906 between the adjusted action embedding 904 and an adjusted utterance embedding 908, and a line 910 between the adjusted action embedding 904 and an adjusted utterance embedding 912.

The first Euclidean distance term in Equation (25) reflects a distance between each original utterance embedding ($r_p$) and a counterpart adjusted utterance embedding ($\hat{r_p}$). The second Euclidean distance term in Equation (25) reflects a distance between a pair of adjusted utterance embeddings ($\hat{r_p}$, $\hat{r_k}$) that are associated with the same actionable item p. In the context of FIG. 9, the second distance term in Equation (25) corresponds to a line 914 between the adjusted utterance embedding 908 and the adjusted utterance embedding 912.

Considered all together, the adaptation component 126 attempts to place the adjusted action embeddings so that they are not too far from their original counterparts. At the same time, the adaptation component 126 attempts to place the adjusted action embeddings so they are not too far from their associated adjusted utterance embeddings. At the same time, the adaptation component 126 attempts to place the adjusted utterance embeddings so that they are not too far from their original counterparts. Finally, the adaptation component 126 attempts to place the adjusted utterance embeddings so they are mutually not too far from each other. The adaptation component 126 performs this minimization with respect to all actionable items.

The adaptation component 126 can solve the above minimization problem using an iterative approach. In this approach, the adaptation component 126 can make updates, upon each iteration, for $\hat{q_p}$ and $\hat{r_p}$ as follows:

$$\Delta \hat{q_p} = \frac{\alpha q_p + \Sigma\beta_{pk}\hat{r_k}}{\alpha + \Sigma\beta} \text{ and } \Delta \hat{r_p} = \frac{\alpha r_p + \Sigma\beta_{pk}\hat{r_k}}{\alpha + \Sigma\beta}. \quad (26)$$

Upon completion of the iterative solving approach, the adaptation component produces a set of adjusted action embeddings $\hat{q_p}$ for all of the actionable items. The adjusted action embeddings can then be used in Equation (5), instead of the original action embeddings. That is, Equation (5) now becomes:

$$S(\overrightarrow{U,A}) = \frac{y_U \cdot \hat{y_A}}{\|y_U\|\|\hat{y_A}\|}. \quad (27)$$

In this equation, $\hat{y_A}$ (which has the same meaning as $\hat{q_p}$) corresponds to the adjusted action embedding associated with a particular actionable item p.

A.5. The Action-Taking Component

Figure 10:
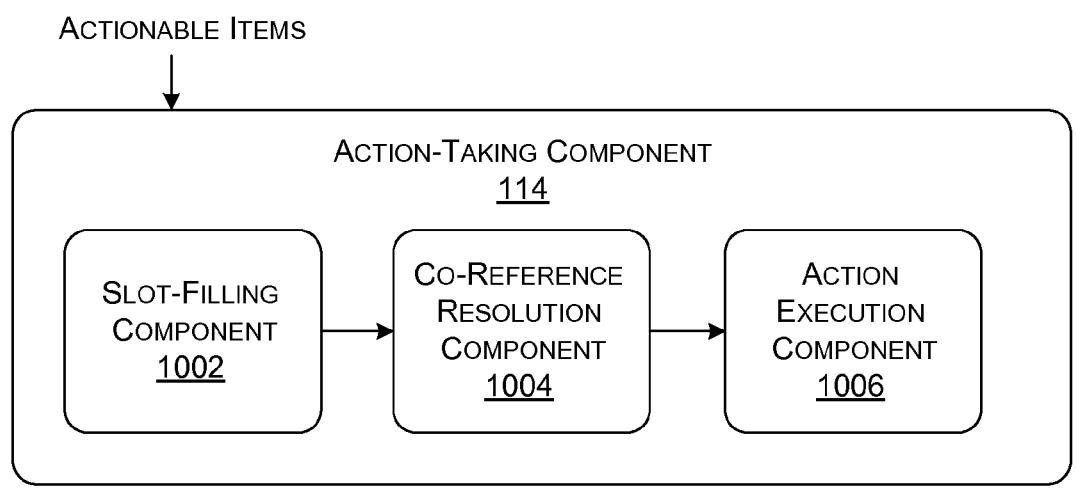
FIG. 10 shows one implementation of an action-taking component, which is another part of the model-application system of FIG. 1.

Advancing to FIG. 10, this figure shows one implementation of the action-taking component 114, introduced in FIG. 1. The action-taking component 114 performs actions associated with whatever actionable items are detected by the action-detection component.

Different environments may use different action-taking components (or different combinations of action-taking components) depending on the nature of the actionable items that are detected. In the case of FIG. 10, a slot-filling component 1002 first parses each detected utterance to identify action values that are needed to perform the actionable item under consideration. For example, assume that the action-determination component 112 determines that a detected utterance specifies a "send email" actionable item. In that case, the slot-filling component 1002 examines the tokens in the detected utterance to attempt to find an action value that specifies who is to send the Email message, who is to receive the Email message, and what the Email message is to say. For example, assume that the detected utterance reads, "Jim should send an Email to Sally to invite her to the party." The slot-filling component 1002 can identify the sender of the Email message as Jim, the recipient of the Email message as Sally, and the content of the Email message as an invitation to a party. The slot-filling component 1002 can use any technique to tag the words and phrases in a detected utterance in the above manner, such as by using a machine-trained Conditional Random Field (CRF) model. In this approach, a CRF model provides the most probable slot sequence defined by:

$$Y = \underset{Y}{\operatorname{argmax}} p(Y \mid X). \quad (27)$$

In this equation, the term X refers to the sequence of tokens in the detected utterance ($x_1, x_2, \ldots, x_T$) and Y refers to the sequence of tags ($y_1, y_2, \ldots, y_T$) assigned to the tokens, where the tags are selected from a set C of possible tags.

A co-reference resolution component 1004 resolves any ambiguities in the output of the slot-filling component 1002. For example, instead of the detected utterance "Jim should send an Email to Sally to invite her to the party," assume that the speaker makes the following utterance: "He should send an Email to her to invite her to it." The co-reference resolution component 1004 can attempt to disambiguate the action values corresponding to "he," "her," and "it." The co-reference resolution component 1004 can perform this task using known technology. For example, in one representative technique, for each ambiguous action value (such as "he"), the co-reference resolution component 1004 can determine a set of candidates tokens from the conversation that may correspond to the identity of the person being referred to as "he." The co-reference resolution component 1004 can then use a machine-trained model to determine a score value for each pairing of the uncertain action value ("he") and a candidate token (e.g., "Jim" in one case). The co-reference resolution component 1004 can then select the candidate token having the most favorable score value.

Alternatively, or in addition, the co-reference resolution component 1004 can rely on one or more manually specified rules to resolve uncertain action values. For example, assume that a conversation is taking place between only two people and one of the participants says, "You should send an Email." The co-reference resolution component 1004 can indicate that the person being referred to as "you" is the other participant in the conversation.

Finally, an action execution component 1006 performs an action that is associated with the actionable item that has been identified, based on the preparatory analysis performed by the slot-filling component 1002 and the co-reference resolution component 1004. For example, the action execution component 1006 can interact with an Email application to send an Email message, find an Email message, etc.

B. Illustrative Processes

FIGS. 11-14 show processes that explain the operation of the model-application system 102 and the training system 106 of Section A in flowchart form. Since the principles underlying the operation of the systems (102, 106) have already been described in Section A, certain operations will be addressed in summary fashion in this section. As noted in the prefatory part of the Detailed Description, the flowcharts are expressed as a series of operations performed in a particular order. But the order of these operations is merely representative, and can be varied in any manner.

Figure 11:
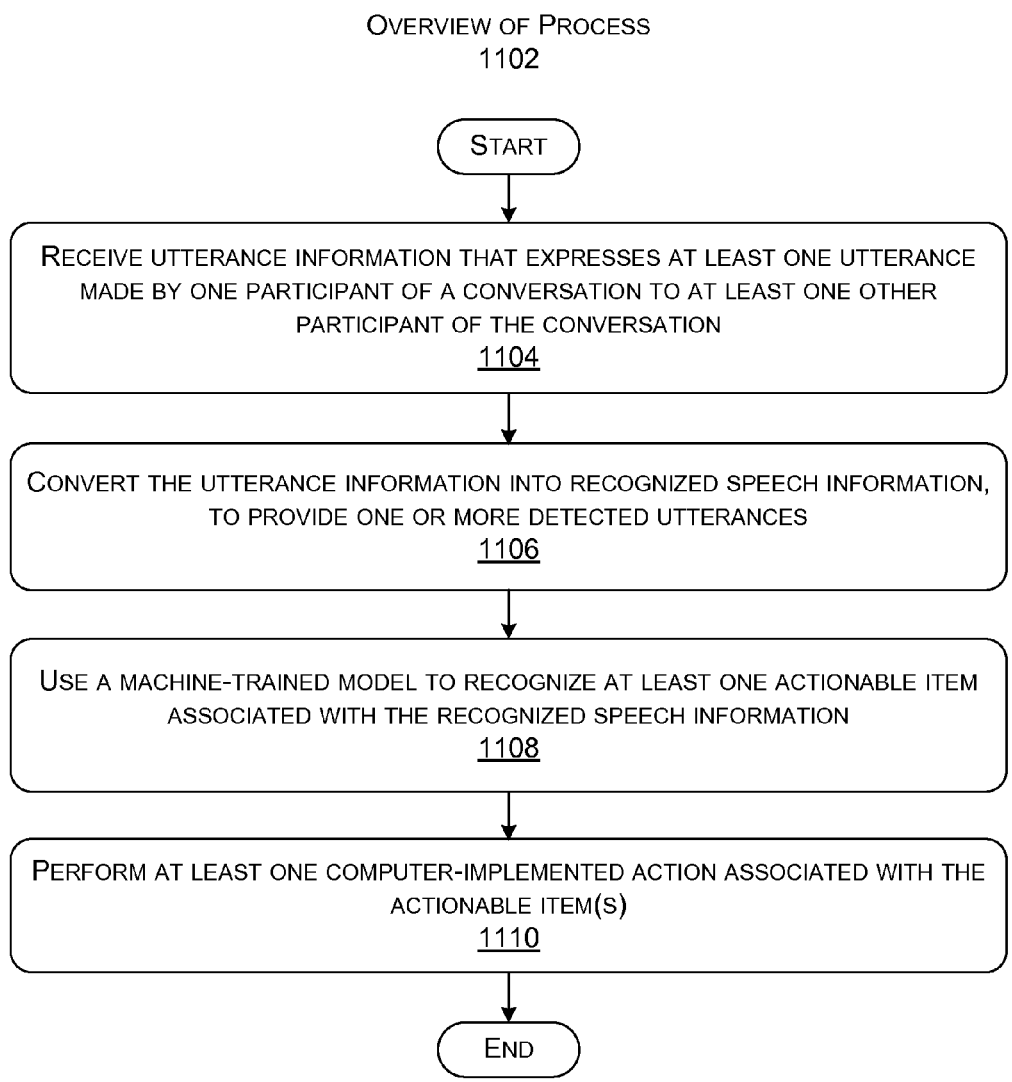
FIG. 11 shows a process that represents an overview of one manner of operation of the system of FIG. 1.

FIG. 11 shows a process 1102 for identifying actionable items in speech, implemented by at least one hardware processor provided by at least one computing device. In block 1104, the model-application system 102 receives utterance information that expresses at least one utterance made by one participant of a conversation to at least one other participant of the conversation. In block 1106, the model-application system 102 converts the utterance information into recognized speech information, to provide one or more detected utterances. In block 1108, the model-application system 102 uses a machine-trained model to detect at least one actionable item associated with the recognized speech information. In block 1110, the model-application system 102 performs at least one action associated with the detected actionable item(s). In one case, the model-application system 102 performs blocks 1104-1110 without disrupting a flow of communication among participants to the conversation.

Figure 12:
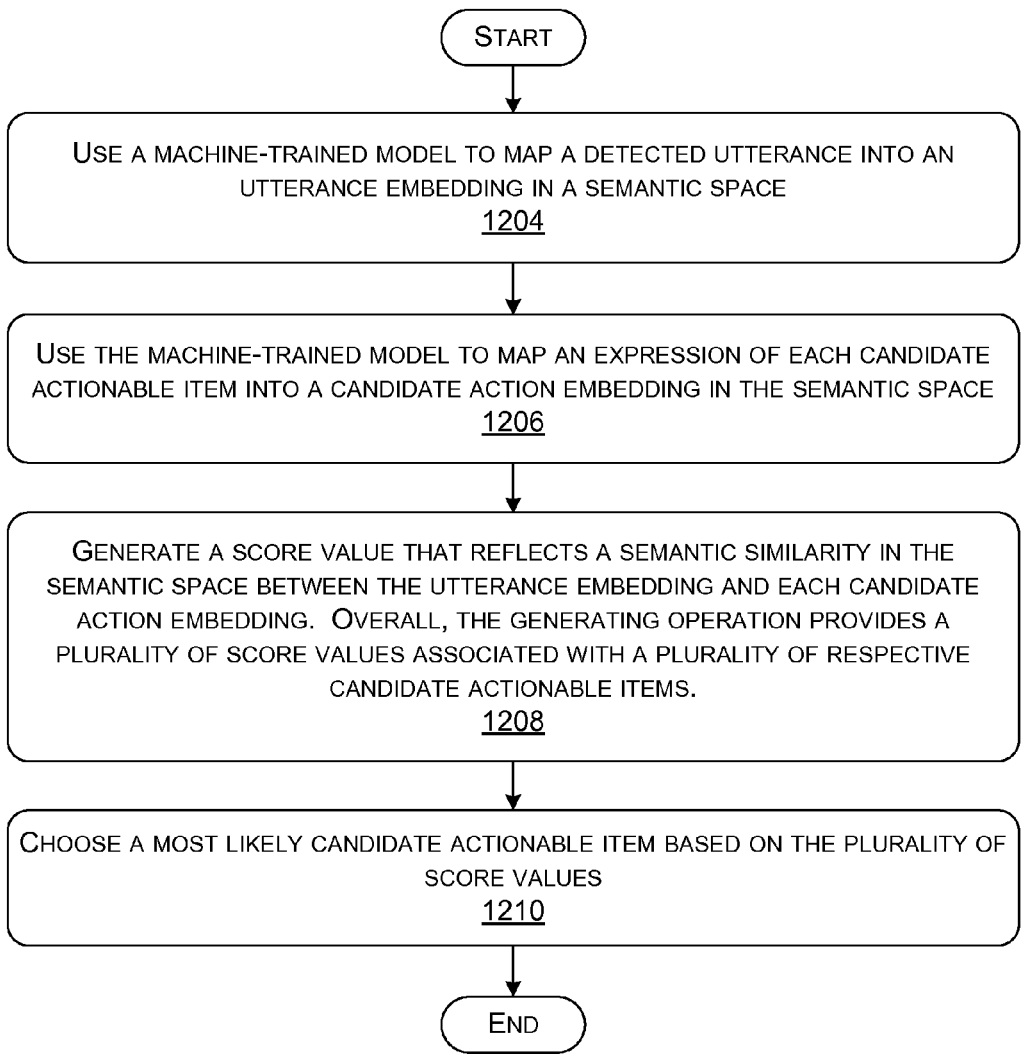
FIG. 12 shows a process that represents one manner of operation of the action-detection component shown in FIG. 4.

FIG. 12 shows a process 1202 for applying a machine-trained model 104 to determine the relevance of a detected utterance to one or more candidate actionable items. In block 1204, the action-detection component 112 uses the machine-trained model 104 to map the detected utterance into an utterance embedding in a semantic space. The utterance embedding captures latent meaning associated with the detected utterance. In block 1206, the action-detection component 112 (or the training system 106) uses the machine-trained model 104 to map an expression of each candidate actionable item into a candidate action embedding in the semantic space. The action embedding represents latent meaning associated with the candidate actionable item. In block 1208, the action-detection component 112 generates a score value that reflects a semantic similarity in the semantic space between the utterance embedding and each candidate action embedding. Overall, the generating operation provides a plurality of score values associated with a plurality of respective candidate actionable items. In block 1210, the action-detection component 112 chooses a most likely candidate actionable item based, at least in part, on the plurality of score values.

Figure 13:
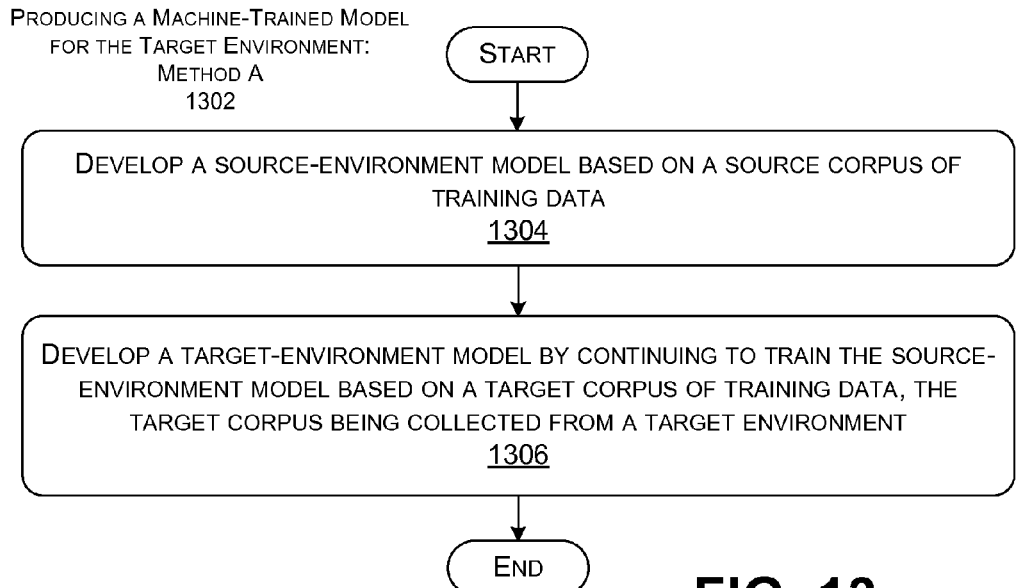
FIG. 13 shows a process that represents one manner by which the adaptation component may convert a source-environment model into a target-environment model.

FIG. 13 shows a process 1302 for producing a machine-trained model. In block 1304, the training system 106 develops a source-environment model 108 based on a source corpus of training data in a data store 118. In block 1306, the training system 106 develops a target-environment model 104 by continuing to train the source-environment model 108 based on a target corpus of training data in a data store 122, the target corpus being collected from the target environment.

Figure 14:
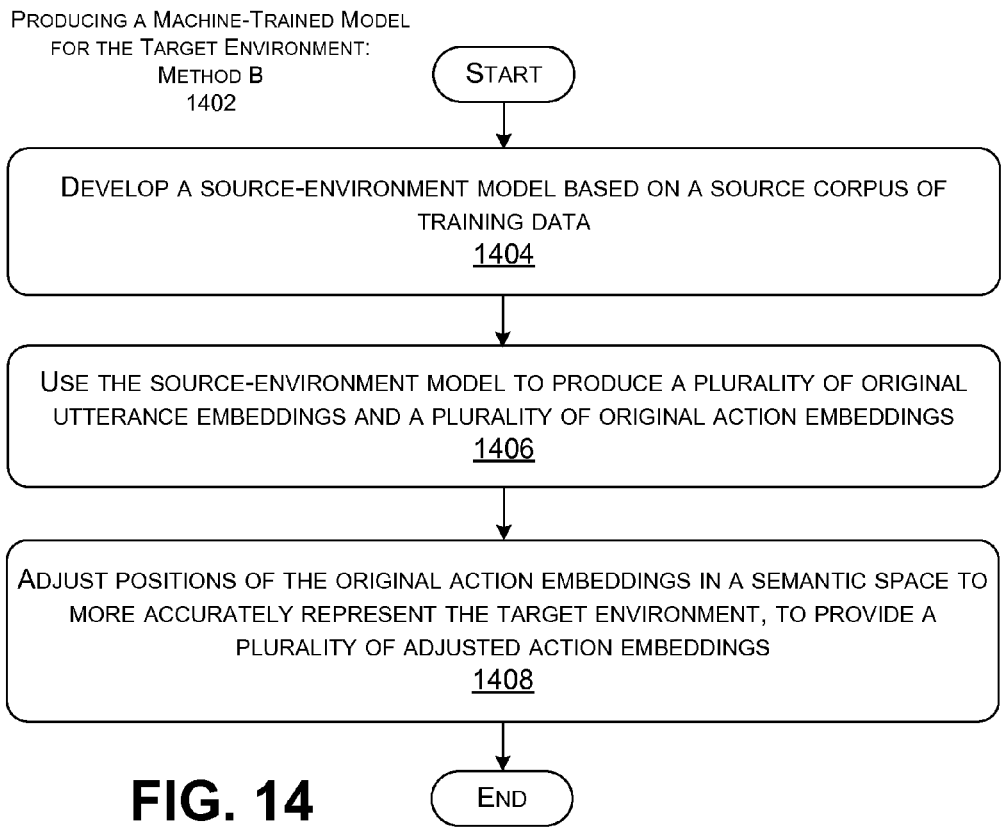
FIG. 14 shows a process that represents another way by which the adaptation component can convert a source-environment model into a target-environment model.

FIG. 14 shows another process 1402 for producing the machine-trained model 104 for use in the model-application system 102. In block 1404, the training system 106 develops a source-environment model 108 based on the source corpus of training data in the data store 118. In block 1406, the training system 106 uses the source-environment model 108 to produce a plurality of original utterance embeddings and a plurality of original action embeddings. Each original utterance embedding is produced by converting a detected target-environment utterance into the original utterance embedding using the source-environment model, and each original action embedding is produced by converting a target-environment actionable item into the original action embedding using the source-environment model. In block 1408, the training system 106 adjusts positions of the original action embeddings in a semantic space to more accurately represent the target environment, to provide a plurality of adjusted action embeddings.

C. Representative Computing Functionality

Figure 15:
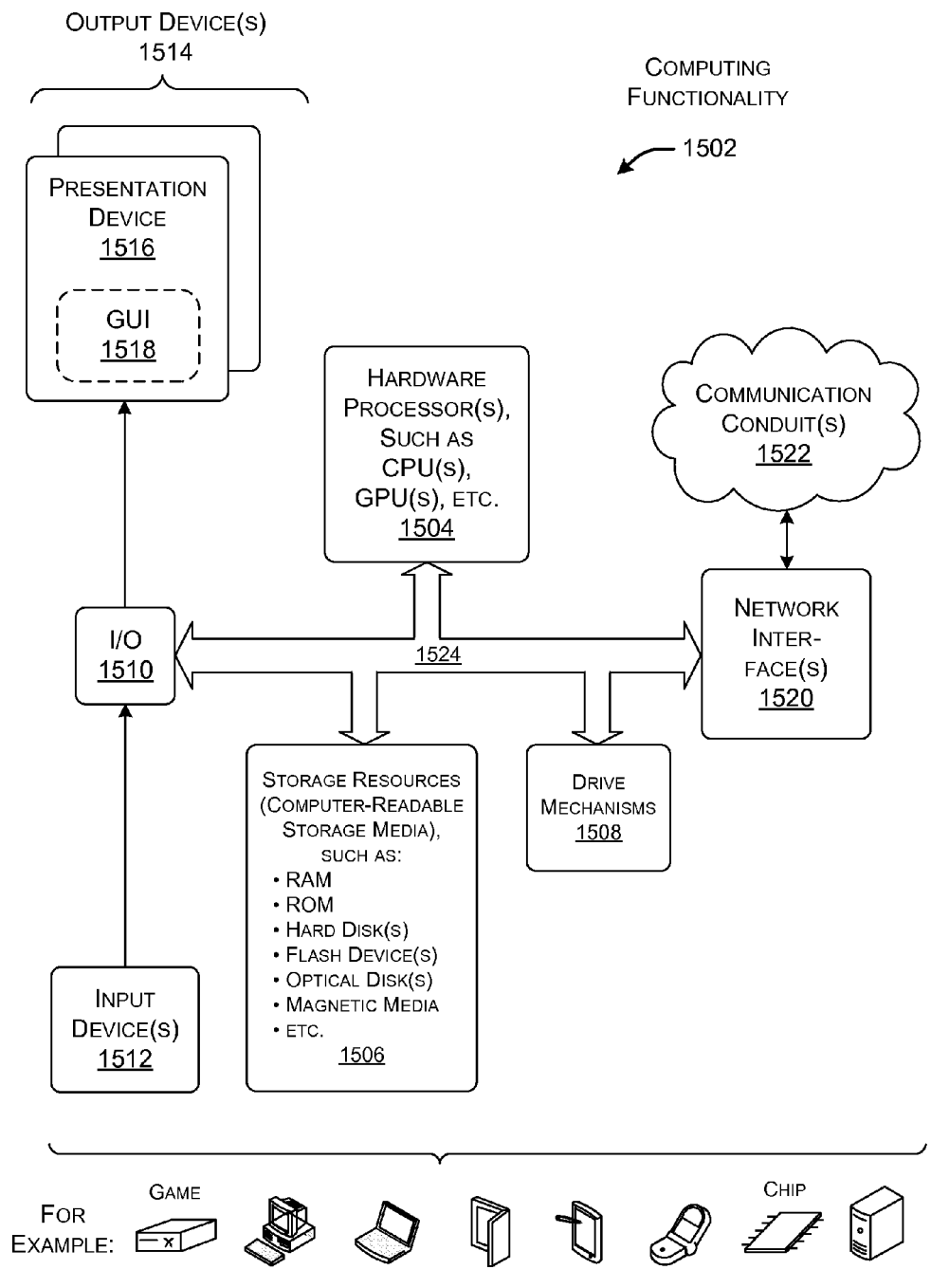
FIG. 15 shows illustrative computing functionality that can be used to implement any aspect of the features shown in the foregoing drawings.

FIG. 15 shows computing functionality 1502 that can be used to implement any aspect of the model-application system 102 and/or training system 106 set forth in FIG. 1. The computing functionality 1502 represents one or more physical and tangible processing mechanisms.

The computing functionality 1502 can include one or more hardware processors 1504, such as one or more central processing units (CPUs), and/or one or more graphical processing units (GPUs), and so on. The computing functionality 1502 can also include any storage resources (also referred to as computer-readable storage media or computer-readable storage medium devices) 1506 for storing any kind of information, such as machine-readable instructions, settings, data, etc. Without limitation, for instance, the storage resources 1506 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 1502. The computing functionality 1502 may perform any of the functions described above when the hardware processor(s) 1504 carry out computer-readable instructions stored in any storage resource or combination of storage resources. The computing functionality 1502 also includes one or more drive mechanisms 1508 for interacting with any storage resource, such as a hard disk drive mechanism, an optical disk drive mechanism, and so on.

The computing functionality 1502 also includes an input/output component 1510 for receiving various inputs (via input devices 1512), and for providing various outputs (via output devices 1514). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 1516 and an associated graphical user interface presentation (GUI) 1518. The presentation device 1516 may correspond to a physical monitor (e.g., a charge-coupled display device, a cathode ray tube device, a projection mechanism, etc.). Other output devices include a printer, a model-generating mechanism, a tactile output mechanism, an archival mechanism (for storing output information), and so on. The computing functionality 1502 can also include one or more network interfaces 1520 for exchanging data with other devices via one or more communication conduits 1522. One or more communication buses 1524 communicatively couple the above-described components together.

The communication conduit(s) 1522 can be implemented in any manner, e.g., by a local area computer network, a wide area computer network (e.g., the Internet), point-to-point connections, etc., or any combination thereof. The communication conduit(s) 1522 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 1502 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a method is described for identifying actionable items, implemented by at least one hardware processor provided by at least one computing device. The method includes: receiving utterance information that expresses at least one utterance made by one participant of a conversation to at least one other participant of the conversation; converting the utterance information to recognized speech information, to provide one or more detected utterances; using a machine-trained model to recognize at least one actionable item associated with the recognized speech information; and performing at least one computer-implemented action associated with the actionable item(s). The method is executed without disrupting a flow of communication among participants to the conversation.

According to a second aspect, the conversation takes place in a meeting among two or more human participants.

According to a third aspect, the above-referenced using the machine-trained model entails, for a particular detected utterance: using the machine-trained model to map the particular detected utterance into an utterance embedding in a semantic space, the utterance embedding capturing latent meaning associated with the particular detected utterance; using the machine-trained model to map an expression of each candidate actionable item into a candidate action embedding in the semantic space, the candidate action embedding representing latent meaning associated with the candidate actionable item; generating a score value that reflects a similarity relation in the semantic space between the utterance embedding and the candidate action embedding, wherein, overall, the above-referenced generating provides a plurality of score values associated with a plurality of respective candidate actionable items; and choosing a most likely candidate actionable item based, at least in part, on the plurality of score values.

According to a fourth aspect, the above-referenced choosing comprises selecting a candidate actionable item having a most favorable score value.

According to a fifth aspect, the above-referenced choosing includes ranking each candidate actionable item using a ranking model to provide a ranking value associated with the candidate actionable item, the ranking model receiving a score value associated with the candidate actionable item as one input feature value. Overall, the above-referenced ranking provides a plurality of ranking values associated with the plurality of respective candidate actionable items. Further, the above-referenced choosing entails choosing a most likely candidate actionable item based on the plurality of ranking values.

According to a sixth aspect, the machine-trained model is a neural network.

According to a seventh aspect, the neural network is a deep-structured convolutional neural network.

According to an eighth aspect, the above-referenced performing at least one action entails, for a particular actionable item associated with a particular utterance: identifying one or more action values that play an operative role in performing an action associated with the particular actionable item; resolving ambiguity in the above-referenced one or more action values, if any, to provide a resolved actionable item; and executing the resolved actionable item.

According to a ninth aspect, the above-referenced using a machine-trained model comprises using a machine-trained model that has been trained, in part, based on a source corpus of training data that has been collected from a source environment, wherein the source environment differs from a target environment in which the machine-trained model is applied.

According to a tenth aspect, the source environment pertains to a domain in which human participants interact with an assistant component, and the target environment pertains to a domain in which human participants directly communicate with each other.

According to an eleventh aspect, each training example in the source corpus of training data corresponds to an utterance made by a participant to the assistant component, together with an actionable item associated with the utterance.

According to a twelfth aspect, the above-referenced using a machine-trained model entails using a machine-trained model that has been trained by: developing a source-environment model based on the source corpus of training data; and developing a target-environment model by continuing to train the source-environment model based on a target corpus of training data, the target corpus being collected from the target environment.

According to a thirteenth aspect, the above-referenced using a machine-trained model comprises using a machine-trained model that has been trained by: developing a source-environment model based on the source corpus of training data; using the source-environment model to produce a plurality of original utterance embeddings and a plurality of original action embeddings, wherein each original utterance embedding is produced by converting a detected target-environment utterance into the original utterance embedding using the source-environment model, and each original action embedding is produced by converting an expression of a target-item actionable item into the original action embedding using the source-environment model; and adjusting positions of the original action embeddings in a semantic space to more accurately represent the target environment, to provide a plurality of adjusted action embeddings.

According to a fourteenth aspect, the above-referenced adjusting is performed by minimizing an objective function that expresses: a distance relation in the semantic space between each adjusted action embedding and its counterpart original action embedding; and a distance relation in the semantic space between each adjusted action embedding and each adjusted utterance embedding that is associated with the adjusted action embedding.

According to a fifteenth aspect, the objective function further expresses: a distance relation in the semantic space between each adjusted utterance embedding and its counterpart original utterance embedding; and a distance relation in the semantic space between each adjusted utterance embedding and a group of other adjusted utterance embeddings that are associated with a same actionable item.

According to a sixteenth aspect, a system is described, implemented by one or more computing devices, for identifying actionable items. The system includes a machine-training component that is configured to provide a source-environment model based on a source corpus of training data. The system further includes an adaptation component configured to adapt the source-environment model to a target environment, to provide a target-environment model. The system further includes a speech recognition component configured to: receive utterance information in the target environment that expresses at least one utterance made by one participant of a conversation to at least one other participant of the conversation; and convert the utterance information to recognized speech information, to provide one or more detected utterances. The system further includes an action-detection component configured to use the target-environment model to recognize at least one actionable item in the recognized speech information.

According to a seventeenth aspect, the system further includes an action-taking component that is configured to perform at least one computer-implemented action associated with the above-referenced at least one actionable item.

According to an eighteenth aspect, the adaptation component is configured to produce the target-environment model by continuing to train the source-environment model based on a target corpus of training data, the target corpus being collected from the target environment According to a nineteenth aspect, the adaptation component is configured to produce the target-environment model by: using the source-environment model to produce a plurality of original utterance embeddings and a plurality of original action embeddings, wherein each original utterance embedding is produced by converting a detected target-environment utterance into the original utterance embedding using the source-environment model, and each original action embedding is produced by converting a target-environment actionable item into the original action embedding using the source-environment model; and adjusting positions of the original action embeddings in a semantic space to more accurately represent the target environment, to provide a plurality of adjusted action embeddings.

According to a twentieth aspect, a computer-readable storage medium is described for storing computer-readable instructions. The computer-readable instructions, when executed by one or more processing devices, perform a method that entails: receiving utterance information that expresses at least one utterance made by one participant of a conversation to at least one other participant of the conversation; converting the utterance information into recognized speech information, to provide one or more detected utterances; and using a machine-trained model to recognize at least one actionable item associated with the recognized speech information. The machine-trained model is trained, in part, based on a source corpus of training data that has been collected from a source environment that differs from a target environment in which the machine-trained model is applied.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

This description may have described various concepts in the context of illustrative challenges or problems. This manner of explanation does not constitute an admission that others have appreciated and/or articulated the challenges or problems in the manner specified herein.

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:
1. A method implemented by at least one hardware processor provided by at least one computing device, the method comprising:
receiving utterance information that expresses at least one utterance made during a conversation involving a plurality of participants;
converting the utterance information to recognized speech information, to provide one or more detected utterances;
using a machine-trained model to:
map a particular detected utterance into a particular utterance embedding in a semantic space;

map candidate actionable items into candidate action embeddings in the semantic space;
generate scores reflecting similarities of the particular utterance embedding to the candidate action embeddings; and
based at least on the scores, recognize a particular actionable item associated with the particular detected utterance; and
performing at least one computer-implemented action associated with said particular actionable item,
said receiving, converting, using, and performing being executed by said at least one hardware processor without disrupting a flow of communication among the plurality of participants in the conversation.

2. The method of claim 1, wherein the conversation takes place in a meeting among two or more human participants.

3. The method of claim 1, wherein
the particular actionable item is recognized by choosing a most likely candidate actionable item from the candidate actionable items based, at least in part, on the scores.

4. The method of claim 3, wherein said choosing comprises selecting the particular actionable item responsive to determining that the particular actionable item has a most favorable score.

5. The method of claim 3, wherein said choosing comprises:
ranking the candidate actionable items using a ranking model to provide corresponding ranking values, the ranking model receiving a corresponding score associated each the candidate actionable item as an input feature value, wherein, overall, said ranking provides ranking values associated with the candidate actionable items, and
wherein said choosing comprises choosing the particular actionable item responsive to determining that the particular actionable item is a most likely candidate actionable item based at least on the ranking values.

6. The method of claim 1, wherein the machine-trained model is a neural network.

7. The method of claim 6, wherein the neural network is a deep-structured convolutional neural network.

8. The method of claim 1, wherein said performing at least one computer-implemented action comprises:
identifying one or more action values that play an operative role in performing the at least one computer-implemented action associated with the particular actionable item;
resolving ambiguity in said one or more action values to provide a resolved actionable item; and
executing the resolved actionable item.

9. The method of claim 1, wherein said using a machine-trained model comprises using a machine-trained model that has been trained, at least in part, based on a source corpus of training data that has been collected from a source environment, wherein the source environment differs from a target environment in which the machine-trained model is applied.

10. The method of claim 9,
wherein the source environment pertains to a domain in which human participants interact with an assistant component, and
wherein the target environment pertains to a domain in which human participants directly communicate with each other.

11. The method of claim 10, wherein each training example in the source corpus of training data corresponds to an utterance made by a participant to the assistant component, together with a corresponding actionable item associated with the utterance.

12. The method of claim 9, wherein said using a machine-trained model comprises using a machine-trained model that has been trained by:
developing a source-environment model based at least on the source corpus of training data; and
developing a target-environment model by continuing to train the source-environment model based at least on a target corpus of training data, the target corpus being collected from the target environment.

13. The method of claim 9, wherein said using a machine-trained model comprises using a machine-trained model that has been trained by:
developing a source-environment model based at least on the source corpus of training data;
using the source-environment model to produce a plurality of original utterance embeddings and a plurality of original action embeddings, each original utterance embedding being produced by converting a detected target-environment utterance into the original utterance embedding using the source-environment model, and each original action embedding being produced by converting an expression of a target-item actionable item into the original action embedding using the source-environment model; and
adjusting positions of the original action embeddings in a semantic space to more accurately represent the target environment, to provide a plurality of adjusted action embeddings.

14. The method of claim 13, wherein said adjusting is performed by minimizing an objective function that expresses:
a distance relation in the semantic space between each adjusted action embedding and its counterpart original action embedding; and
a distance relation in the semantic space between each adjusted action embedding and each adjusted utterance embedding that is associated with the adjusted action embedding.

15. The method of claim 14, wherein the objective function further expresses:
a distance relation in the semantic space between each adjusted utterance embedding and its counterpart original utterance embedding; and
a distance relation in the semantic space between each adjusted utterance embedding and a group of other adjusted utterance embeddings that are associated with a same actionable item.

16. A system comprising:
a hardware processor; and
a storage resource storing machine-readable instructions which, when executed by the hardware processor, cause the hardware processor to:
provide a source-environment model based at least on a source corpus of training data, the source-environment model being configured to produce original utterance embeddings in a semantic space and original action embeddings in the semantic space;
adapt the source-environment model to a target environment to provide a target-environment model, the source-environment model being adapted by adjusting positions of the original action embeddings to obtain adjusted action embeddings that are relatively more accurate than the original action embeddings with respect to the target environment;

receive utterance information in the target environment that expresses at least one utterance made by one participant of a conversation to at least one other participant of the conversation;

convert the utterance information to recognized speech information, to provide one or more detected utterances; and use the target-environment model to recognize at least one actionable item in the recognized speech information.

17. The system of claim 16, wherein the machine-readable instructions, when executed by the hardware processor, cause the hardware processor to:

perform at least one computer-implemented action associated with said at least one actionable item.

18. The system of claim 16, wherein the machine-readable instructions, when executed by the hardware processor, cause the hardware processor to:

adapt the source-environment model by adjusting positions of the original utterance embeddings to obtain adjusted utterance embeddings.

19. The system of claim 18, wherein the machine-readable instructions, when executed by the hardware processor, cause the hardware processor to:

adapt the source-environment model by attempting to place the adjusted action embeddings relatively close to corresponding original action embeddings and attempting to place the adjusted utterance embeddings relatively close to corresponding original utterance embeddings.

20. A computer-readable storage medium storing computer-readable instructions, the computer-readable instructions, when executed by one or more processing devices:

receiving utterance information that expresses at least one utterance made by one participant of a conversation to at least one other participant of the conversation;

converting the utterance information into recognized speech information, to provide one or more detected utterances; and using a machine-trained model to recognize at least one actionable item associated with a particular detected utterance, based at least on a score provided by the machine-trained model that reflects similarity of the at least one actionable item to the particular detected utterance in a semantic space, the machine-trained model being trained, at least in part, based on a source corpus of training data that has been collected from a source environment that differs from a target environment in which the machine-training model is applied.

* * * * *